US010712434B2

(12) United States Patent
Hall et al.

(10) Patent No.: US 10,712,434 B2
(45) Date of Patent: *Jul. 14, 2020

(54) MULTI-CHANNEL LIDAR ILLUMINATION DRIVER

(71) Applicant: Velodyne Lidar, Inc., Morgan Hill, CA (US)

(72) Inventors: David S. Hall, San Jose, CA (US); Raymond Liou, Cupertino, CA (US); Oren Milgrome, Richmond, CA (US); Pravin Kumar Venkatesan, Fremont, CA (US)

(73) Assignee: VELODYNE LIDAR, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,068

(22) Filed: Sep. 18, 2018

(65) Prior Publication Data

US 2020/0088851 A1    Mar. 19, 2020

(51) Int. Cl.
| G01S 7/481 | (2006.01) |
| G01S 7/484 | (2006.01) |
| G01S 7/486 | (2020.01) |
| G01S 7/4865 | (2020.01) |

(52) U.S. Cl.
CPC .................. *G01S 7/4865* (2013.01)

(58) Field of Classification Search
CPC ............ H01L 27/0629; H01L 27/0605; H01L 23/528; H01L 29/2003; G01S 7/484; G01S 7/4814; G01S 17/42; G01S 7/4865; H05K 2201/10151; H05K 2201/10022; H05K 2201/10121; H05K 2201/10015; H05K 2201/10106; H05K 2201/10166
USPC .................................................... 356/4.01
See application file for complete search history.

(56) References Cited

U.S. PATENT DOCUMENTS

| 7,969,558 | B2 | 6/2011 | Hall | |
| 8,675,181 | B2 | 3/2014 | Hall | |
| 8,767,190 | B2 | 7/2014 | Hall | |
| 10,386,465 | B2 * | 8/2019 | Hall | .................... H01L 27/0629 |
| 2018/0321360 | A1 * | 11/2018 | Hall | ........................ G01S 7/4811 |
| 2019/0001442 | A1 * | 1/2019 | Unrath | ................. B23K 26/082 |
| 2019/0293764 | A1 * | 9/2019 | Van Nieuwenhove | ...................... H01L 27/14643 |
| 2019/0339365 | A1 * | 11/2019 | Hall | .................... H01L 27/0605 |

* cited by examiner

*Primary Examiner* — Daniel L Murphy

(74) *Attorney, Agent, or Firm* — Goodwin Procter LLP

(57) ABSTRACT

LIDAR measurement systems employing a multiple channel, GaN based illumination driver integrated circuit (IC) are described herein. In one aspect, the multiple channel, GaN based illumination driver IC selectively couples each illumination source associated with each measurement channel to a source of electrical power to generate a measurement pulse of illumination light. In one aspect, each pulse trigger signal associated with each measurement channel is received on a separate node of the IC. In another aspect, additional control signals are received on separate nodes of the IC and communicated to all of the measurement channels. In another aspect, the multiple channel, GaN based illumination driver IC includes a power regulation module that supplies regulated voltage to various elements of each measurement channel only when any pulse trigger signal is in a state that triggers the firing of an illumination pulse.

20 Claims, 15 Drawing Sheets

MULTI-CHANNEL LIDAR ILLUMINATION DRIVER

TECHNICAL FIELD

The described embodiments relate to LIDAR based 3-D point cloud measuring systems.

BACKGROUND INFORMATION

LIDAR systems employ pulses of light to measure distance to an object based on the time of flight (TOF) of each pulse of light. A pulse of light emitted from a light source of a LIDAR system interacts with a distal object. A portion of the light reflects from the object and returns to a detector of the LIDAR system. Based on the time elapsed between emission of the pulse of light and detection of the returned pulse of light, a distance is estimated. In some examples, pulses of light are generated by a laser emitter. The light pulses are focused through a lens or lens assembly. The time it takes for a pulse of laser light to return to a detector mounted near the emitter is measured. A distance is derived from the time measurement with high accuracy.

Some LIDAR systems employ a single laser emitter/detector combination combined with a rotating mirror to effectively scan across a plane. Distance measurements performed by such a system are effectively two dimensional (i.e., planar), and the captured distance points are rendered as a 2-D (i.e. single plane) point cloud. In some examples, rotating mirrors are rotated at very fast speeds (e.g., thousands of revolutions per minute).

In many operational scenarios, a 3-D point cloud is required. A number of schemes have been employed to interrogate the surrounding environment in three dimensions. In some examples, a 2-D instrument is actuated up and down and/or back and forth, often on a gimbal. This is commonly known within the art as "winking" or "nodding" the sensor. Thus, a single beam LIDAR unit can be employed to capture an entire 3-D array of distance points, albeit one point at a time. In a related example, a prism is employed to "divide" the laser pulse into multiple layers, each having a slightly different vertical angle. This simulates the nodding effect described above, but without actuation of the sensor itself.

In all the above examples, the light path of a single laser emitter/detector combination is somehow altered to achieve a broader field of view than a single sensor. The number of pixels such devices can generate per unit time is inherently limited due limitations on the pulse repetition rate of a single laser. Any alteration of the beam path, whether it is by mirror, prism, or actuation of the device that achieves a larger coverage area comes at a cost of decreased point cloud density.

As noted above, 3-D point cloud systems exist in several configurations. However, in many applications it is necessary to see over a broad field of view. For example, in an autonomous vehicle application, the vertical field of view should extend down as close as possible to see the ground in front of the vehicle. In addition, the vertical field of view should extend above the horizon, in the event the car enters a dip in the road. In addition, it is necessary to have a minimum of delay between the actions happening in the real world and the imaging of those actions. In some examples, it is desirable to provide a complete image update at least five times per second. To address these requirements, a 3-D LIDAR system has been developed that includes an array of multiple laser emitters and detectors. This system is described in U.S. Pat. No. 7,969,558 issued on Jun. 28, 2011, the subject matter of which is incorporated herein by reference in its entirety.

In many applications, a sequence of pulses is emitted. The direction of each pulse is sequentially varied in rapid succession. In these examples, a distance measurement associated with each individual pulse can be considered a pixel, and a collection of pixels emitted and captured in rapid succession (i.e., "point cloud") can be rendered as an image or analyzed for other reasons (e.g., detecting obstacles). In some examples, viewing software is employed to render the resulting point clouds as images that appear three dimensional to a user. Different schemes can be used to depict the distance measurements as 3-D images that appear as if they were captured by a live action camera.

Some existing LIDAR systems employ an illumination source and a detector that are not integrated together onto a common substrate (e.g., electrical mounting board). Furthermore, the illumination beam path and the collection beam path are separated within the LIDAR device. This leads to opto-mechanical design complexity and alignment difficulty.

In addition, mechanical devices employed to scan the illumination beams in different directions may be sensitive to mechanical vibrations, inertial forces, and general environmental conditions. Without proper design these mechanical devices may degrade leading to loss of performance or failure.

To measure a 3D environment with high resolution and high throughput, the measurement pulses must be very short. Current systems suffer from low resolution because they are limited in their ability to generate short duration pulses.

Saturation of the detector limits measurement capability as target reflectivity and proximity vary greatly in realistic operating environments. In addition, power consumption may cause overheating of the LIDAR system. Light devices, targets, circuits, and temperatures vary in actual systems. The variability of all of these elements limits system performance without proper calibration of the photon output of each LIDAR device.

Improvements in the illumination drive electronics and receiver electronics of LIDAR systems are desired to improve imaging resolution and range.

SUMMARY

Methods and systems for performing three dimensional LIDAR measurements with a LIDAR measurement system employing a multiple channel, GaN based illumination driver integrated circuit (IC) are described herein. The multiple channel, GaN based illumination driver IC includes field effect transistors (FETs) that offer higher current density than conventional silicon based complementary metal oxide on silicon (CMOS) devices. As a result the GaN based illumination driver is able to deliver relatively large currents to each illumination source with significantly less power loss.

In one aspect, an illumination driver of a LIDAR measurement device is a multiple channel, GaN based IC that selectively couples each illumination source associated with each measurement channel to a source of electrical power to generate a measurement pulse of illumination light. The response of each measurement channel is controlled by a pulse trigger signal and a number of control signals received onto the multiple channel, GaN based illumination driver IC.

In another aspect, each pulse trigger signal associated with each independent measurement channel is received on a separate node of the multiple channel, GaN based illumination driver IC. In this manner, each measurement channel responds to a trigger signal that is unique to each measurement channel.

In another aspect, each of the control signals are received on a separate node of the multiple channel and each of the control signals is communicated to all of the measurement channels of the multiple channel, GaN based illumination driver IC. In this manner, each measurement channel responds to control signals that are shared among all of the measurement channels of the multiple channel, GaN based illumination driver IC.

In another aspect, the multiple channel, GaN based illumination driver IC includes a power regulation module. The power regulation module only supplies regulated voltage to various elements of each measurement channel when any pulse trigger signal received by the illumination driver IC is in a state that triggers the firing of an illumination pulse. In this manner, power is not supplied to many circuit elements during periods of time when the illumination driver IC is not required to trigger a pulse emission.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Figure 1:
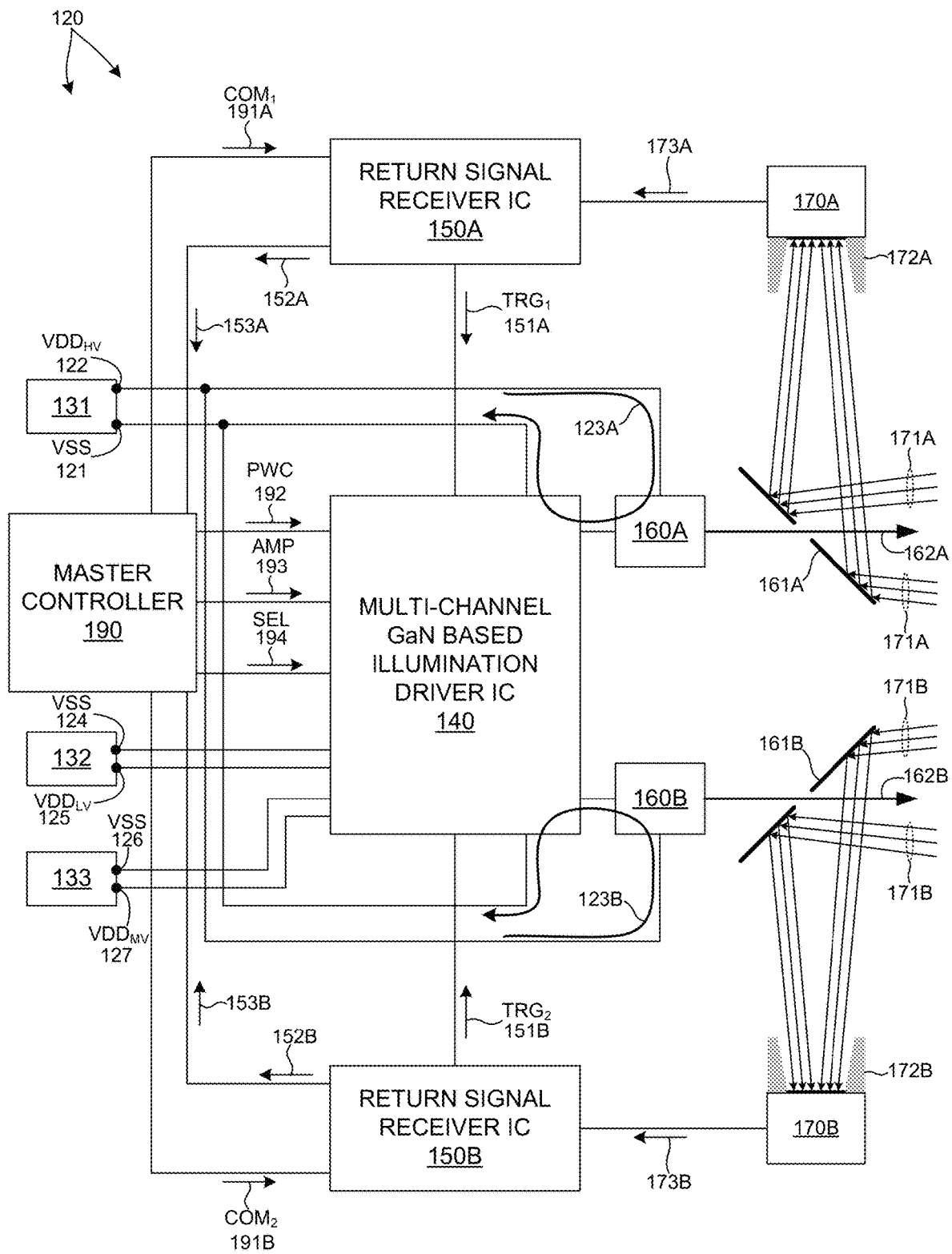
FIG. 1 is a simplified diagram illustrative of one embodiment of a LIDAR measurement system including a multiple channel, GaN based illumination driver in at least one novel aspect.

FIG. 1 depicts a two channel LIDAR measurement system 120 in one embodiment. LIDAR measurement system 120 includes a master controller 190 and a multiple channel Gallium Nitride (GaN) based illumination driver integrated circuit (IC) 140. In addition, each channel of LIDAR measurement system 120 includes a return signal receiver IC, a photodetector, and an illumination source. As depicted in FIG. 1, LIDAR measurement channel A includes return signal receiver IC 150A, photodetector 170A and illumination source 160A. Similarly, LIDAR measurement channel B includes return signal receiver IC 150B, photodetector 170B and illumination source 160B. In some embodiments, the multiple channel GaN based illumination driver IC 140, illumination sources 160A-B, photodetectors 170A-B, and return signal receiver ICs 150A-B are mounted, either directly or indirectly, to a common substrate (e.g., printed circuit board) that provides mechanical support and electrical connectivity among the elements.

In addition, LIDAR measurement system 120 includes one or more voltage supplies that provide voltage to various electronic elements and electrical power to illumination devices 160A-B. As depicted in FIG. 1, LIDAR measurement system 120 includes a low signal voltage supply 132 configured to supply a relatively low voltage across nodes $VDD_{LV}$ 125 and VSS 124. In some embodiments, the low signal voltage supply is approximately five volts. This voltage is selected to ensure that the voltage supplied at the gates of one or more of the transistors of multiple channel GaN based illumination driver IC 140 does not exceed the damage threshold. In addition, LIDAR measurement system 120 includes a medium signal voltage supply 133 configured to supply a voltage across nodes $VDD_{MV}$ 127 and VSS 126 that is higher than the voltage supplied by the low signal voltage supply. In some embodiments, the voltage supplied by the medium signal voltage supply is approximately twelve volts. This voltage is selected to ensure fast switching transitions of one or more of the transistors of multiple channel GaN based illumination driver IC 140. In addition, LIDAR measurement system 120 includes a power voltage supply 131 configured to supply a voltage across nodes VDD$_{HV}$ 122 and VSS 121 that is higher than the voltage supplied by the medium voltage supply. In some embodiments, the voltage supplied by the power voltage supply is approximately fifteen to twenty volts. The power voltage supply is configured to supply high current 123A and 123B (e.g., one hundred amperes, or more) to illumination sources 160A and 160B, respectively, that causes illumination sources 160A and 160B to each emit a pulse of measurement light.

Although, preferred output voltages have been described herein, in general, the low signal voltage supply, the medium signal voltage supply, and the power voltage supply may be configured to supply any suitable voltages. In general, any of the power supplies described herein may be mounted to a separate substrate and electrically coupled to the various electronic elements in any suitable manner. Although the power supplies 131, 132, and 133 are described as voltage supplies with reference to FIG. 1, in general, any electrical power source described herein may be configured to supply electrical power specified as voltage or current. Hence, any electrical power source described herein as a voltage source or a current source may be contemplated as an equivalent current source or voltage source, respectively.

Each illumination source 160A-B emits a measurement pulse of illumination light 162A-B in response to a corresponding pulse of electrical current 123A-B. Each beam of illumination light 162A-B is focused and projected onto a location in the surrounding environment by one or more optical elements of the LIDAR system.

In some embodiments, each illumination source 160A-B is laser based (e.g., laser diode). In some embodiments, each illumination source is based on one or more light emitting diodes. In general, any suitable pulsed illumination source may be contemplated.

As depicted in FIG. 1, illumination light 162A-B emitted from each channel of LIDAR measurement system 120 and corresponding return measurement light 171A-B directed toward LIDAR measurement system 120 share a common optical path. Each channel of LIDAR measurement system 120 includes a photodetector 170A-B. As depicted in FIG. 1, an overmold lens 172A-B is mounted over each photodetector 170A-B, respectively. Each overmold lens 172A-B includes a conical cavity that corresponds with the ray acceptance cone of return light 171A-B, respectively. Return light 171A-B is reflected from mirrors 161A-B to corresponding photodetectors 170A-B, respectively. As depicted in FIG. 1, each illumination source 160A-B is located outside the field of view of each photodetector. Illumination light 162A-B from illumination sources 160A-B is injected into the corresponding detector reception cone through an opening in mirrors 161A-B, respectively.

As depicted in FIG. 1, return light 171A-B reflected from the surrounding environment is detected by photodetectors 170A-B, respectively. In some embodiments, each photodetector is an avalanche photodiode. Each photodetector generates an output signal 173A-B that is communicated to corresponding return signal receiver ICs 150A-B. Each receiver IC 150A-B includes timing circuitry and a time-to-digital converter that estimates the time of flight of each measurement pulse from each illumination source 160A-B, to reflective objects in the three dimensional environment, and back to each corresponding photodetector 170A-B. Signals 152A-B indicative of the estimated times of flight are communicated to master controller 190 for further processing and communication to a user of the LIDAR measurement system 120. In addition, each return signal receiver IC 150A-B is configured to digitize segments of each corresponding return signal 173A-B that include peak values (i.e., return pulses), and communicate signals 153A-B indicative of the digitized segments to master controller 190. In some embodiments, master controller 190 processes these signal segments to identify properties of detected objects.

Master controller 190 is configured to generate pulse command signals 191A-B communicated to receiver ICs 150A-B, respectively. In general, LIDAR measurement system 120 includes any number of LIDAR measurement channels. In these embodiments, master controller 190 communicates a pulse command signal to each different LIDAR measurement channel. In this manner, master controller 190 coordinates the timing of LIDAR measurements performed by any number of LIDAR measurement channels.

Each pulse command signal is a digital signal generated by master controller 190. Thus, the timing of each pulse command signal is determined by a clock associated with master controller 190. In some embodiments, each pulse command signal 191A-B is directly used to trigger pulse generation by multiple channel GaN based illumination driver IC 140 and data acquisition by each corresponding receiver IC 150A-B. However, illumination driver IC 140 and each receiver IC 150A-B do not share the same clock as master controller 190. For this reason, precise estimation of time of flight becomes much more computationally tedious when a pulse command signal is directly used to trigger pulse generation and data acquisition.

In one aspect, each receiver IC 150A-B receives a pulse command signal 191A-B and generates corresponding pulse trigger signals 151A and 151B, in response to pulse command signals 191A-B, respectively. Each pulse trigger signal 151A-B is communicated to illumination driver IC 140 and directly triggers illumination driver IC 140 to electrically couple each illumination source 160A-B to power supply 131 and generate a corresponding pulse of illumination light 162A-B. In addition, each pulse trigger signal 151A-B directly triggers data acquisition of return signals 173A-B and associated time of flight calculations. In this manner, pulse trigger signals 151A-B generated based on the internal clock of receiver ICs 150A-B, respectively, is employed to trigger both pulse generation and return pulse data acquisition for a particular LIDAR measurement channel. This ensures precise synchronization of pulse generation and return pulse acquisition which enables precise time of flight calculations by time-to-digital conversion.

Figure 2:
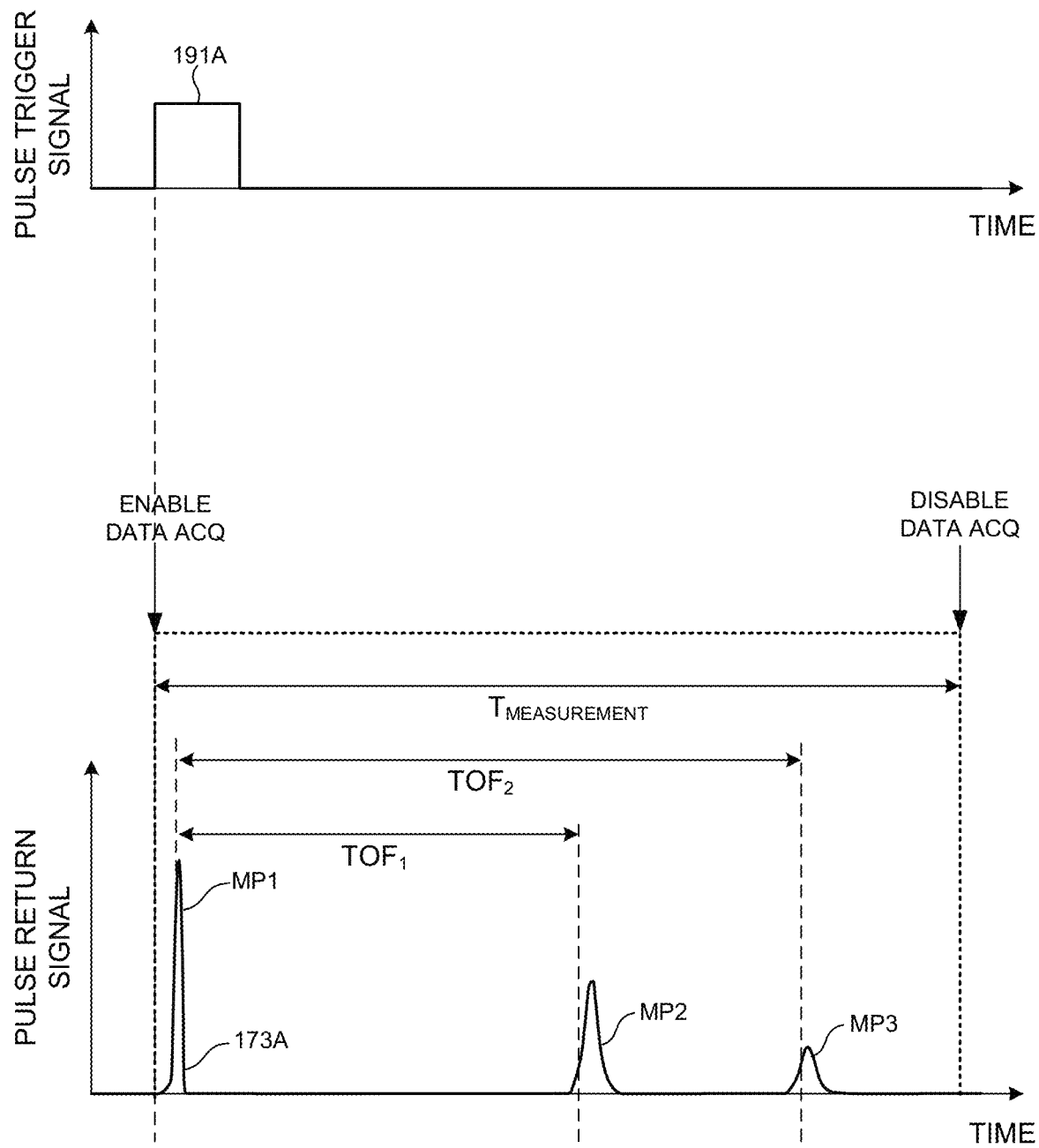
FIG. 2 depicts an illustration of the timing associated with the emission of a measurement pulse and capture of the returning measurement pulse.

FIG. 2 depicts an illustration of the timing associated with the emission of a measurement pulse from channel A of LIDAR measurement system 120 and capture of the returning measurement pulse. As depicted in FIG. 2, a measurement is initiated by the rising edge of pulse trigger signal 191A generated by receiver IC 150A. As depicted in FIGS. 1 and 2, a return signal 173A is received by receiver IC 150A. As described hereinbefore, a measurement window (i.e., a period of time over which collected return signal data is associated with a particular measurement pulse) is initiated by enabling data acquisition at the rising edge of pulse trigger signal 191A. Receiver IC 150A controls the duration of the measurement window, $T_{measurement}$, to correspond with the window of time when a return signal is expected in response to the emission of a measurement pulse sequence. In some examples, the measurement window is enabled at the rising edge of pulse trigger signal 191A and is disabled at a time corresponding to the time of flight of light over a distance that is approximately twice the range of the LIDAR system. In this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

As depicted in FIG. 2, return signal 173A includes three return measurement pulses (e.g., MP1, MP2, and MP3) that correspond with the emitted measurement pulse. In general, signal detection is performed on all detected measurement pulses. Further signal analysis may be performed to identify the closest valid signal P1 (i.e., first valid instance of the return measurement pulse), the strongest signal, and the furthest valid signal P3 (i.e., last valid instance of the return measurement pulse in the measurement window). Any of these instances may be reported as potentially valid distance measurements by the LIDAR system.

Internal system delays associated with emission of light from the LIDAR system (e.g., signal communication delays and latency associated with the switching elements, energy storage elements, and pulsed light emitting device) and delays associated with collecting light and generating signals indicative of the collected light (e.g., amplifier latency, analog-digital conversion delay, etc.) contribute to errors in the estimation of the time of flight of a measurement pulse of light. Thus, measurement of time of flight based on the elapsed time between the rising edge of the pulse trigger signal 191A and each return pulse (i.e., MP1, MP2, and MP3) introduces undesireable measurement error. In some embodiments, a calibrated, pre-determined delay time is employed to compensate for the electronic delays to arrive at a corrected estimate of the actual optical time of flight. However, the accuracy of a static correction to dynamically changing electronic delays is limited. Although, frequent re-calibrations may be employed, this comes at a cost of computational complexity and may interfere with system up-time.

In another aspect, each receiver IC 150A-B measures time of flight based on the time elapsed between the detection of a detected pulse (e.g., MP1) due to internal cross-talk between each illumination source 160A-B and corresponding photodetector 170A-B and a valid return pulse (e.g., MP2 and MP3). In this manner, systematic delays are eliminated from the estimation of time of flight. Pulse MP1 is generated by internal cross-talk with effectively no distance of light propagation. Thus, the delay in time from the rising edge of the pulse trigger signal and the instance of detection of pulse MP1 captures all of the systematic delays associated with illumination and signal detection. By measuring the time of flight of valid return pulses (e.g., return pulses MP2 and MP3) with reference to detected pulse MP1, all of the systematic delays associated with illumination and signal detection due to internal cross-talk are eliminated. As depicted in FIG. 2, receiver IC 150A estimates the time of flight, $TOF_1$, associated with return pulse MP2 and the time of flight, $TOF_2$, associated with return pulse MP3 with reference to return pulse MP1.

In some embodiments, the signal analyses are performed by receiver ICs 150A-B, entirely. In these embodiments, signals 152A-B communicated include an indication of the time of flight determined by receiver IC 150A-B, respectively. In some embodiments, signals 153A-B include digitized segments of return signals 173A-B generated by receiver ICs 150A-B, respectively. These raw measurement signal segments are processed further by one or more processors located on board the 3-D LIDAR system, or external to the 3-D LIDAR system to arrive at another estimate of distance, an estimate of one of more physical properties of the detected object, or a combination thereof.

In one aspect, a LIDAR measurement system includes a multiple channel GaN based illumination driver IC that selectively couples an illumination source corresponding to each measurement channel to a source of electrical power to generate a measurement pulse of illumination light in response to a pulse trigger signal. The multiple channel GaN based illumination driver includes field effect transistors (FETs) that offer higher current density than conventional silicon based complementary metal oxide on silicon (CMOS) devices. As a result the GaN based illumination driver is able to deliver relatively large currents to an illumination source with significantly less power loss than a silicon based driver.

As depicted in FIG. 1, multiple channel GaN based illumination driver IC 140 is coupled to a voltage node 121 of power voltage supply 131 and nodes of illumination sources 160A-B, each corresponding to a different LIDAR measurement channel. Another node of each illumination source 160A-B is coupled to voltage node 122 of power voltage supply 131. In response to each pulse trigger signal 151A-B, one or more field effect transistors (FETs) of illumination driver IC 140 becomes substantially conductive, and effectively couples each corresponding illumination source 160A-B to node 121. This induces high current flows 123A-B through illumination sources 160A-B, respectively, which stimulates the emission of measurement pulses of illumination light 162A-B.

Figure 3:
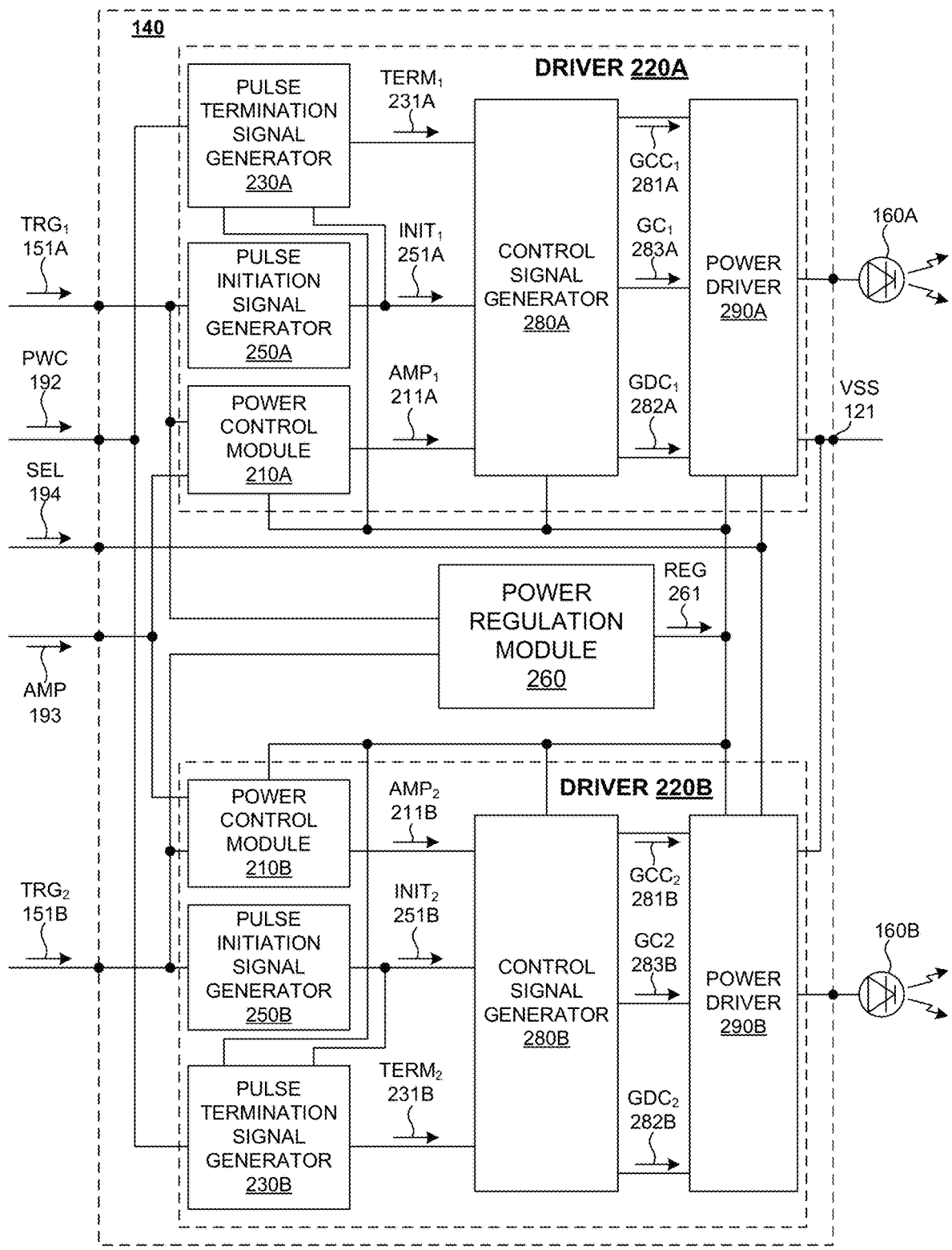
FIG. 3 depicts a simplified diagram illustrative of a multiple channel, GaN based illumination driver IC in one embodiment.

FIG. 3 depicts multiple channel GaN based illumination driver IC 140 in one embodiment. In the embodiment depicted in FIG. 3, illumination driver IC 140 includes two independently controlled illumination driver channels, drivers 220A and 220B. However, in general, a multiple channel GaN based illumination driver IC as described herein may include any number of independently controlled illumination driver channels.

In one aspect, many input signals provided to illumination driver IC 140 are shared by both drivers 220A and 220B. This reduces the size of illumination driver IC 140 by minimizing chip and routing area that would be required to accommodate a larger number of separate control signals. In the embodiment depicted in FIG. 3, pulse width control signal 192, selection signal 194, and amplitude control signal 193 are all shared by drivers 220A and 220B (i.e., each of these signals is received on chip on a node and distributed to various elements of drivers 220A and 220B on chip).

In the embodiment depicted in FIG. 3, the pulse trigger signals 151A and 151B provided to drivers 220A and 220B are the only signals received onto illumination driver IC 140 that are individually provided to drivers 220A and 220B, respectively, and thus are not shared by drivers 220A and 220B.

In some examples, master controller 190 communicates pulse trigger signals to each measurement channel of the LIDAR measurement system 100 such that only one channel of the LIDAR measurement system is firing at a given time. In some of these examples, master controller 190 updates the shared control signals supplied to all of the measurement channels (e.g., pulse width control signal 192, selection signal 194, and amplitude control signal 193) to desired values for each firing instance of each measurement channel. In this manner, master controller 190 independently controls the pulse emission parameters of each LIDAR measurement channel with control signals shared by all LIDAR measurement channels.

In some other examples, master controller 190 communicates pulse trigger signals to a subset of measurement channels of the LIDAR measurement system 100 such that only the subset of measurement channels are firing at a given time. In some of these examples, master controller 190 updates the shared control signals supplied to all of the measurement channels (e.g., pulse width control signal 192, selection signal 194, and amplitude control signal 193) to desired values for each firing instance of each subset of measurement channels. In this manner, master controller 190 independently controls the pulse emission parameters of each subset of LIDAR measurement channels with control signals shared by all LIDAR measurement channels.

In some other embodiments, pulse width control signal 192, selection signal 194, and amplitude control signal 193 are communicated to multi-channel GaN based illumination driver IC 140 from a return signal receiver IC of illumination driver IC 140, rather than master controller 190.

In another aspect, an illumination driver IC includes a power regulation module that supplies a regulated voltage to various elements of each measurement channel when any pulse trigger signal received by the illumination driver IC is in a state that triggers the firing of an illumination pulse. In this manner, power is not supplied to many circuit elements during periods of time when illumination driver IC 140 is not required to trigger a pulse emission. As depicted in FIG. 3, illumination driver IC 140 includes a power regulation module 260 that supplies a regulated voltage 261 to various elements of drivers 220A and 220B when pulse trigger signal 151A, pulse trigger signal 151B, or both, are in a state (e.g., high state or low state) that triggers the firing of an illumination pulse. In the embodiment depicted in FIG. 3, regulated voltage 261 is supplied to power drivers 290A-B, control signal generators 280A-B, pulse termination signal generators 230A-B, and power control modules 210A-B only when either, or both, pulse trigger signals 151A-B are in a state that triggers the firing of an illumination pulse.

As depicted in FIG. 3, each illumination driver includes a pulse termination signal generator, a pulse initiation signal generator, a power control module, a control signal generator, and a power driver. For example, illumination driver 220A includes a pulse initiation signal generator 250A that generates pulse initiation signal 251A based on pulse trigger signal 151A. Pulse initiations signal 251A is communicated to pulse termination signal generator 230A and control signal generator 280A. Pulse termination signal generator 230A generates a pulse termination signal 231A based on pulse width control signal 192 and pulse initiation signal 251A. Power control module 210A generates a channel amplitude control signal 211A based on pulse trigger signal 151A. Control signal generator 280 generates gate control signal 293A, gate charge control signal 281A, and gate discharge control signal 282A based on pulse initiation signal 251A, pulse termination signal 231A, and channel amplitude control signal 211A. Power driver 290A includes a number of field effect transistors (FETS) that control the flow of current through illumination source 160A based on gate control signal 293A, gate charge control signal 281A, and gate discharge control signal 282A.

Similarly, illumination driver 220B includes a pulse initiation signal generator 250B that generates pulse initiation signal 251B based on pulse trigger signal 151B. Pulse initiations signal 251B is communicated to pulse termination signal generator 230B and control signal generator 280B. Pulse termination signal generator 230B generates a pulse termination signal 231B based on pulse width control signal 192 and pulse initiation signal 251B. Power control module 210B generates a channel amplitude control signal 211B based on pulse trigger signal 151B. Control signal generator 280 generates gate control signal 293B, gate charge control signal 281B, and gate discharge control signal 282B based on pulse initiation signal 251B, pulse termination signal 231B, and channel amplitude control signal 211B. Power driver 290B includes a number of field effect transistors (FETS) that control the flow of current through illumination source 160B based on gate control signal 293B, gate charge control signal 281B, and gate discharge control signal 282B.

In another aspect, the number of FETS employed to generate electrical current flow through an illumination source is controlled by selection signal 194. By controlling the number of FETS employed to generate electrical current flow through an illumination source, the amount of current flow generated through the illumination source for a given set of transistor control signals (e.g., gate control signals 293A-B, gate charge control signals 281A-B, and gate discharge control signals 282A-B) is controlled.

Figure 4:
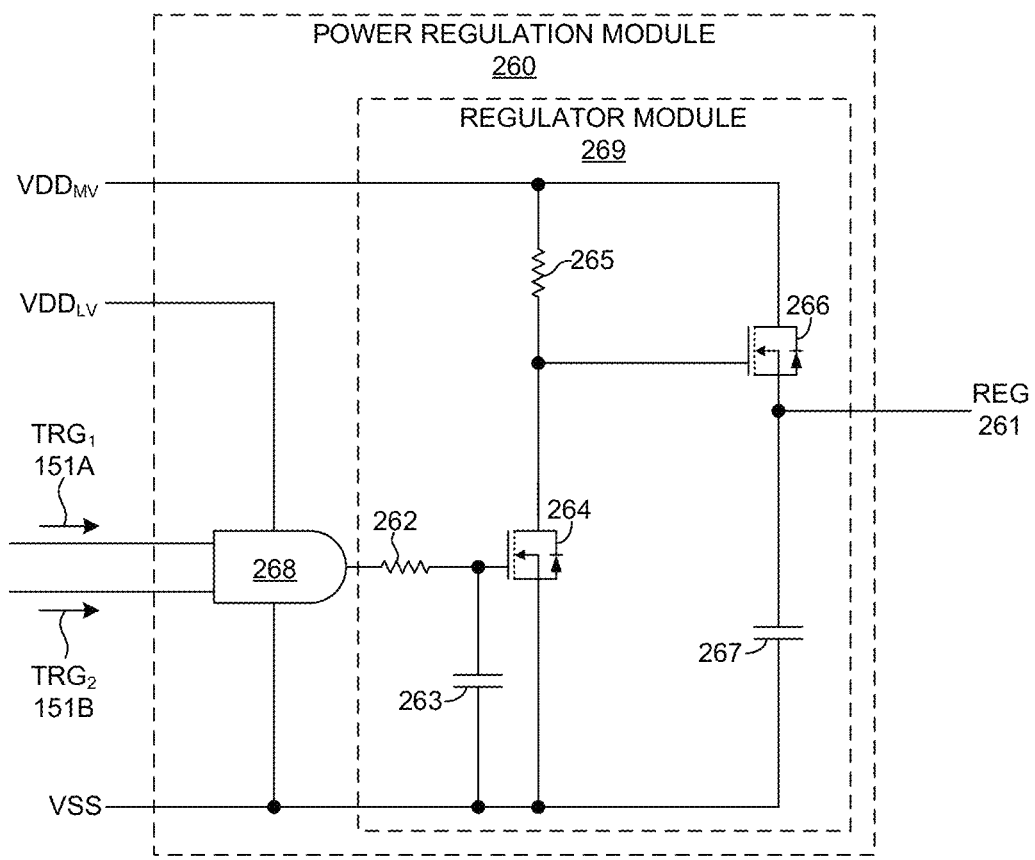
FIG. 4 depicts a simplified diagram illustrative of one embodiment of a power regulation module of the multiple channel, GaN based illumination driver IC depicted in FIG. 3.

FIG. 4 depicts a power regulation module 260 in one embodiment. As depicted in FIG. 3, illumination driver IC 140 includes a power regulation module 260 that controls the power supplied to a portion of the circuitry of multiple channel GaN based illumination driver IC 140 to reduce power consumption. In operation, the illumination driver IC 140 spends a relatively short amount of time generating a measurement pulse and a relatively long amount of time waiting for a trigger signal to generate the next measurement pulse. During these idle periods, it is desireable to reduce or eliminate power supplied to circuit components that do not need to be active for the entire waiting period. As depicted in FIG. 4, power regulation module 260 is coupled between voltage nodes $VDD_{MV}$ and VSS of signal voltage supply 132 depicted in FIG. 1. In addition, power regulation module 260 receives pulse trigger signals 151A and 151B from master controller 190 and, in response, generates a regulated voltage, REG, that is supplied to various portions of illumination driver IC 140. For example, REG is provided to power control module 210 depicted in FIG. 5, pulse termination signal generator 230 depicted in FIG. 8, control signal generator 280 depicted in FIG. 9, and the main FET groups 491A-N depicted in FIG. 11.

FIG. 4 depicts power regulation module 260 in one embodiment. As depicted in FIG. 4, power regulation module 260 includes a logical AND circuit module 268 that receives pulse trigger signals 151A and 151B and generates an input signal to regulator module 269. The value of the input signal is determined by the values of pulse trigger signals 151A and 151B. If either or both of pulse trigger signals 151A and 151B is in a low state (i.e., indicating a trigger to fire one or both illumination channels), the value of the input signal is low. In this scenario FET 264 is "off" and FET 266 is diode connected. As a result a non-zero regulated voltage 261 is provided by regulator module 269. If pulse trigger signals 151A and 151B are both in a high state (i.e., indicating no trigger to fire either of the illumination channels), the value of the input signal is high. In this scenario FET 264 is "on" and the gate voltage of FET 266 is driven to VSS. As a result zero regulated voltage 261 is provided by regulator module 269. In this scenario, no electrical power is supplied by power regulation module 260.

As depicted in FIG. 4, logic circuit 268 is an active circuit coupled to voltage nodes 124 and 125 of low voltage supply 132 depicted in FIG. 1. In addition, regulator module 269 is coupled to voltage nodes 126 and 127 of medium voltage supply 133 depicted in FIG. 1. As depicted in FIG. 4, $VDD_{MV}$ is provided to one node of resistor 265 and the drain of FET 266. The other node of resistor 265 is coupled to the drain of FET 264 and the gate of FET 266. VSS is provided to the source of FET 264, one node of capacitor 263 and one node of capacitor 267. The other node of capacitor 263 is coupled to the gate of FET 264 and a node of resistor 262. The other node of resistor 262 is coupled to the output of logic circuit 268. The other node of capacitor 267 is coupled to the source of FET 266, where the output of power regulation module 260 is provided.

Resistor 262 and capacitor 263 create an RC network that introduces a delay at the gate of FET 264. This introduces a delay ($T_{D\text{-}SLEEP}$ depicted in FIG. 12) between the rising edge of TRG1 and the time when REG drops to VSS during sleep mode.

Figure 12:
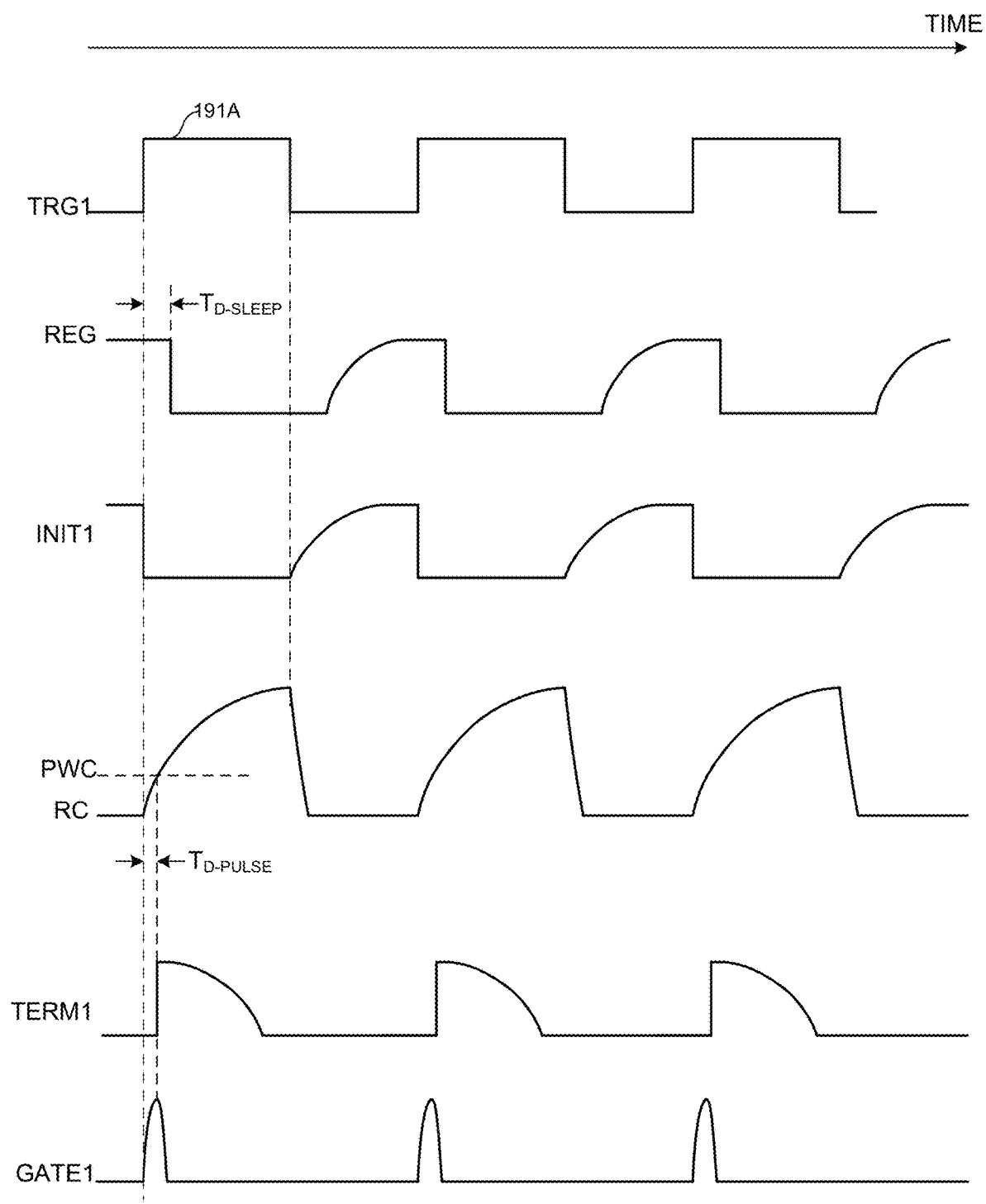
FIG. 12 depicts a simplified illustration of the changes in various operational signals of the multiple channel, GaN based illumination driver IC depicted in FIG. 3.

FIG. 12 depicts a simplified illustration of the changes in the regulated voltage, REG, generated by the power regulation module 260 in response to any of the pulse trigger signals, TRG1 and TRG, being in a state that triggers the firing of an illumination pulse. As depicted in FIG. 12, at the rising edge of one, or both, of the pulse trigger signals, the regulated voltage remains high for a period of time, $T_{D\text{-}SLEEP}$. This length of time is determined by the values of resistor 262 and capacitor 263. After this period of time, the REG drops quickly. At the falling edge of TRG1, the regulated voltage remains low for a period of time and then ramps up to a relatively high voltage value, so that the illumination driver IC 140 is ready to generate a measurement pulse in response to the subsequent rising edge of TRG1.

In another aspect, each channel of an illumination driver IC includes a power control module that generates a channel amplitude control signal and communicates the signal to the corresponding control signal generator. When the pulse trigger signal associated with a particular measurement channel is in a state that triggers the firing of an illumination pulse, the power control module generates a channel amplitude control signal having a value of the amplitude control signal received from the master controller. However, when the pulse trigger signal associated with the particular measurement channel is in a state that does not trigger the firing of an illumination pulse, the power control module generates a channel amplitude control signal having a zero value. In this manner, power is not supplied to circuit elements of the corresponding control signal generator and power driver during periods of time when the particular LIDAR measurement channel is not required to trigger a pulse emission.

Figure 5:
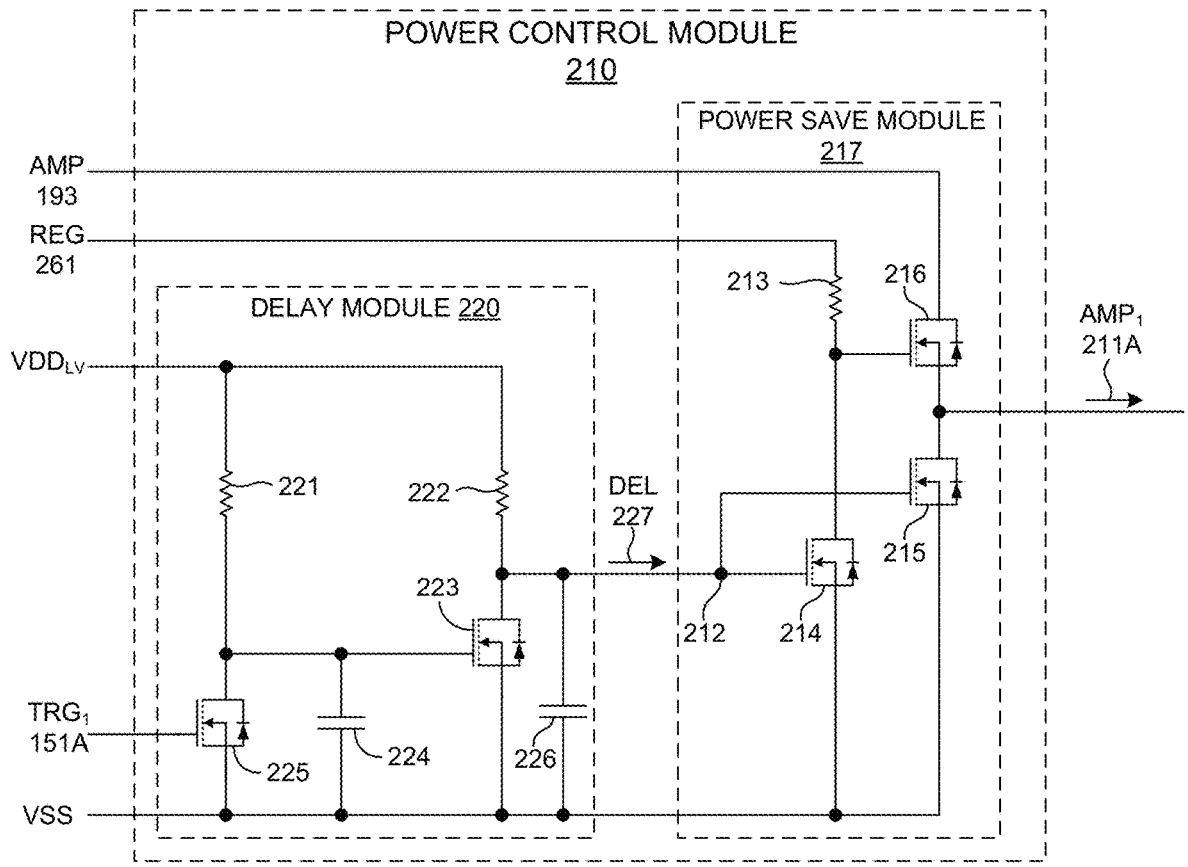
FIG. 5 depicts a simplified diagram illustrative of one embodiment of a power control module of the multiple channel, GaN based illumination driver IC depicted in FIG. 3.

FIG. 5 depicts a power control module 210 in one embodiment. Power control module 210 is replicated as power control module 210A and 210B in illumination driver IC 140 depicted in FIG. 3. As depicted in FIG. 5, power control module 210 is implemented as power control module 210A depicted in FIG. 3 for explanatory purposes. Power control module 210 includes a delay module 220 that receives a pulse trigger signal (e.g., pulse trigger signal 151A) and generates a delayed pulse trigger signal 227. Power save module 217 receives the delayed pulse trigger signal 227 and generates channel pulse amplitude signal 211A based on the delayed pulse trigger signal 227 and pulse amplitude control signal 193 shared among all measurement channels of illumination driver IC 140.

As depicted in FIG. 5, delay module 220 includes resistors 221 and 222, capacitors 224 and 226, and FETS 223 and 225. VSS is supplied to the source of FET 225, the source of FET 223, a first node of capacitor 224 and a first node of capacitor 226. Pulse trigger signal 151A is provided at the gate of FET 225. The drain of FET 225 is coupled to a second node of capacitor 224, the gate of FET 223 and a first node of resistor 221. The drain of FET 223 is coupled to a second node of capacitor 226 and a first node of resistor 222. Delayed pulse trigger signal 227 is provided at the drain of FET 223. $VDD_{LV}$ is provided at the second node of resistors 221 and 222. Power save module 217 includes resistor 213 and FETS 214, 215, and 216. VSS is supplied to the source of FET 214 and the source of FET 215. The gate of FET 214 and the gate of FET 215 are coupled to the drain of FET 223. In this manner, delayed pulse trigger signal 227 at node 212 is supplied to the gates of FETS 214 and 215. Regulated voltage 261 is provided at a first node of resistor 213. The second node of resistor 213 is coupled to the gate of FET 216. Amplitude control signal 193 is provided at the drain of FET 216. The source of FET 216 is coupled to the drain of FET 215, where the channel amplitude control signal 211A is present.

Figure 6:
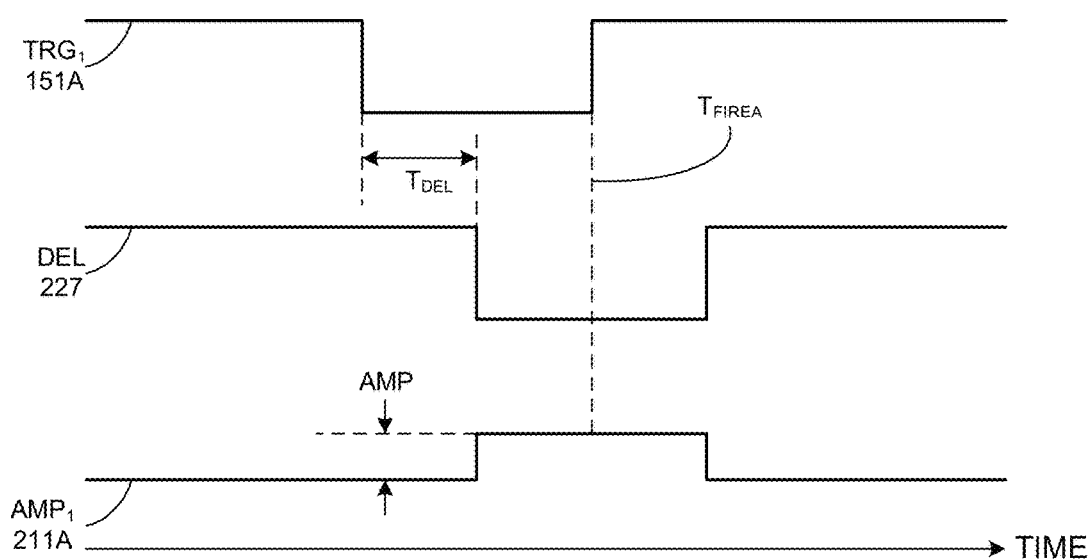
FIG. 6 depicts a simplified illustration of the changes in various operational signals of the power control module depicted in FIG. 5.

As depicted in FIG. 6, delay module 220 generates a delayed pulse trigger signal 227 having a time delay, $T_{DEL}$, from pulse trigger signal 151A. Power save module 217 generates a channel amplitude control signal 211A having an amplitude value, AMP, that matches the amplitude value of the amplitude control signal 193 at the falling edge of delayed pulse trigger signal 227. Channel amplitude control signal 211A maintains the amplitude value, AMP, until the rising edge of delayed pulse trigger signal 227. At this instance, the channel amplitude control signal 211A drops to a zero value. Due to the time delay, $T_{DEL}$, the firing of an illumination pulse from channel A occurs at a time, $T_{FIREA}$, when the amplitude value of channel amplitude control signal 211A is at the amplitude value, AMP, of the amplitude control signal 193. In this manner, the amplitude value, AMP, of the amplitude control signal 193 is effectively transmitted to the control signal generator 280 around the period of time when control signal generator 280 generates control signals that cause an illumination pulse to be emitted from the corresponding LIDAR measurement channel. However, at other times, when the LIDAR measurement channel is idle, a zero valued signal is transmitted to the control signal generator 280.

Figure 7:
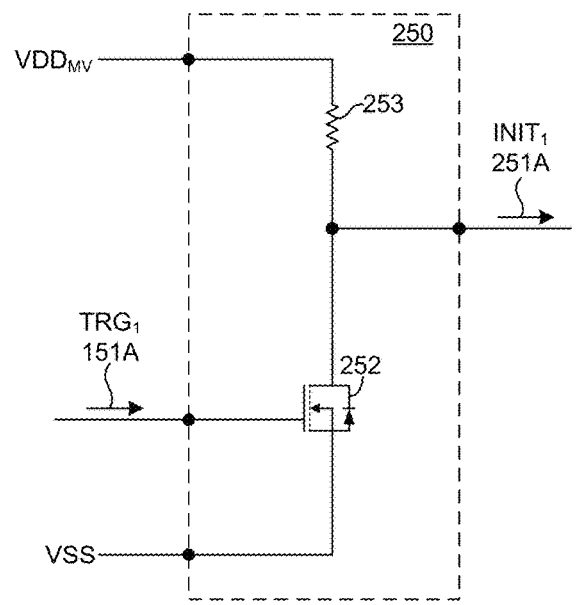
FIG. 7 depicts a simplified diagram illustrative of one embodiment of a pulse initiation signal generator of the multiple channel, GaN based illumination driver IC depicted in FIG. 3.

FIG. 7 depicts a pulse initiation signal generator 250 in one embodiment. Pulse initiation signal generator 250 is replicated as pulse initiation signal generators 250A and 250B in illumination driver IC 140 depicted in FIG. 3. As depicted in FIG. 7, pulse initiation signal generator 250 is implemented as pulse initiation signal generator 250A depicted in FIG. 3 for explanatory purposes. Pulse initiation signal generator 250 generates a pulse initiation signal 251A based on the pulse trigger signal 151A. Pulse initiation signal generator 250 includes a FET 252 and a resistor 253. Pulse trigger signal 151A is provided on the gate of FET 252. VSS is provided to the source of FET 252. $VDD_{MV}$ is provided to a first node of resistor 253 and a second node of resistor 253 is coupled to the drain of FET 252. Pulse initiation signal 251A is provided at the drain of FET 252.

FIG. 12 depicts a simplified illustration of the changes in the pulse initiation signal, INIT1, generated by the pulse initiation signal generator 250 in response to the pulse trigger signal, TRG1. As depicted in FIG. 12, at the rising edge of the pulse trigger signal, INIT1, drops to a low voltage value, VSS, very quickly. At the falling edge of TRG1, INIT1 ramps up to the value of $VDD_{MV}$, so that the illumination driver IC 140 is ready to generate a falling pulse initiation signal in response to the subsequent rising edge of TRG1.

Figure 8:
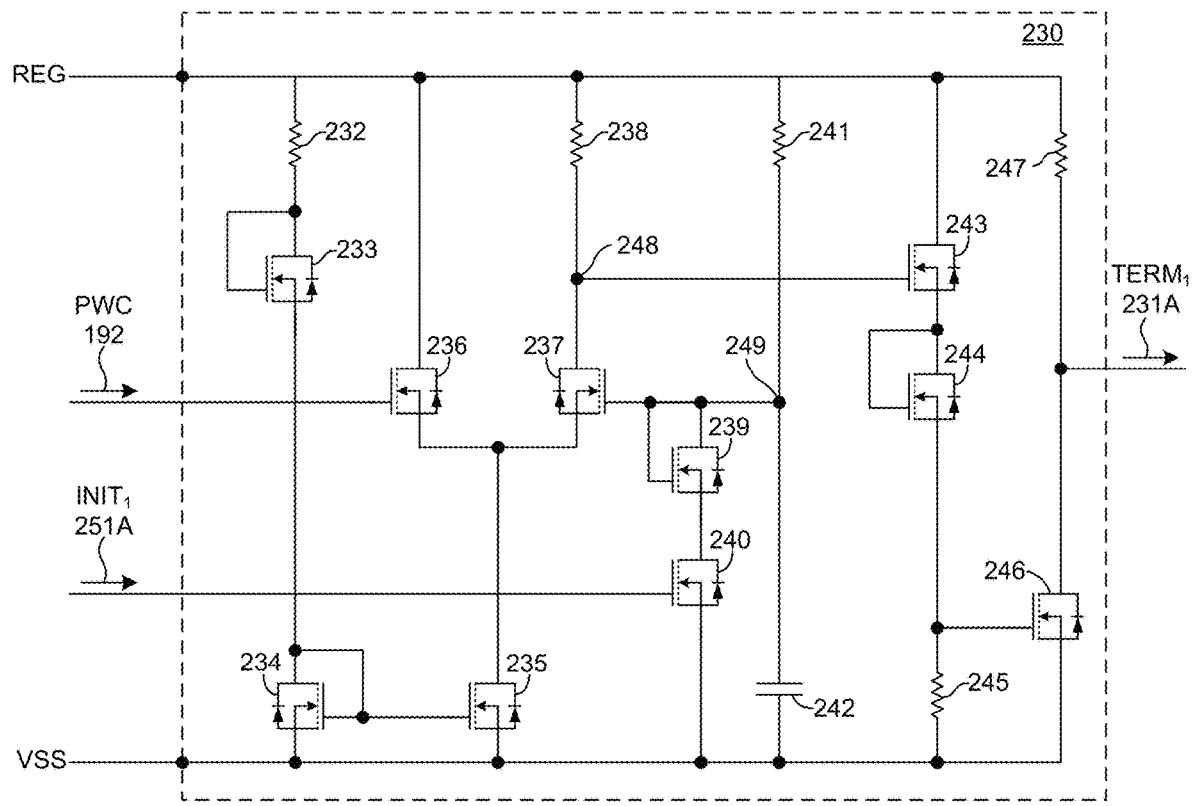
FIG. 8 depicts a simplified diagram illustrative of one embodiment of a pulse termination signal generator of the multiple channel, GaN based illumination driver IC depicted in FIG. 3.

FIG. 8 depicts a pulse termination signal generator 230 in one embodiment. Pulse termination signal generator 230 is replicated as pulse termination signal generators 230A and 230B in illumination driver IC 140 depicted in FIG. 3. As depicted in FIG. 8, pulse termination signal generator 230 is implemented as pulse termination signal generator 230A depicted in FIG. 3 for explanatory purposes. Pulse termination signal generator 230 is configured to generate a pulse of programmable duration based on a value of an analog input signal. As depicted in FIG. 1, master controller 190 generates an analog pulse width control signal 192, and communicates PWC 192 to illumination driver IC 140. In response, illumination driver IC 140 changes the pulse duration based on the received value of PWC 192. In the embodiment depicted in FIG. 8, pulse termination signal generator 230 receives, PWC 192 and INIT1 251A and generates a pulse termination signal, TERM1 231A, having a delay from INIT1 251A programmed in accordance with a value of PWC 192.

As depicted in FIG. 8, pulse termination signal generator 230 includes resistor 238 and FETs 236-237 configured as an operational amplifier. The output of the operational amplifier is coupled to the gate of FET 243. The operational amplifier receives PWC 192 as input at the gate of FET 236. In addition, the operational amplifier receives an input voltage 249 at the gate of FET 237. When the input voltage 249 exceeds the value of PWC 192, the value of output voltage 248 switches transitions to a low value. When the value of PWC 192 exceeds the value of input voltage 249, the value of output voltage 248 transitions to a high value. Input voltage 249 is the voltage of the RC circuit formed by resistor 241 and capacitor 242. INIT1 251A is received at the gate of FET 240. When INIT1 251A transitions to a low value (at the start of pulse), FET 240 effectively disconnects the RC circuit from VSS. This allows the RC circuit to begin to charge. FET 239 provides a nonzero starting voltage for the RC circuit. As the voltage of the RC circuit rises, eventually it exceeds the value of PWC 192, thus triggering the transition of output node 248. Since the voltage ramp rate of the RC circuit is constant, the delay until the transition of output voltage 248 is determined in part by the value of PWC 192. The larger the value of PWC 192, the longer the delay from pulse initiation before the generation of the termination signal, TERM1 231A. In this manner, the value of PWC 192 determines the pulse duration. Pulse termination signal generator 230 includes resistor 232 and FETs 233-235 configured as a current source for the operational amplifier structure. FETS 243 and 244 are configured to scale down the value of output voltage 248. Resistors 245 and 247 and FET 246 are configured to invert the scaled value of output voltage 248. The pulse termination signal, TERM1 231A, is provided at the drain of FET 246.

FIG. 12 depicts a simplified illustration of the changes in the pulse termination signal, TERM1 231A, generated by the pulse termination signal generator 230 in response to the pulse initiation signal, INIT1 251A and the pulse width control signal, PWC 192. As depicted in FIG. 12, when INIT1 goes low, the voltage of the RC circuit begins to ramp up. At the point in time when the voltage of the RC circuit exceeds PWC, TERM1 goes high, holds for a period of time and then ramps down again. Note that the period of time, $T_{D-PULSE}$ between pulse initiation and the rising edge of TERM1 determines the relative duration of the measurement pulse. At the falling edge of TRG1, TERM1 ramps down again so that the illumination driver IC 140 is ready to generate a pulse termination signal for the subsequent pulse.

As depicted, in FIG. 12, the gate voltage, GATE1, of main FET 141, or group of FETS, is also depicted.

As depicted in FIG. 3, illumination driver IC 140 includes pulse termination signal generators 230A-B that generate pulse termination signals, TERM1 and TERM2, based on corresponding pulse initiation signals. Together, the pulse initiation signals and the pulse termination signals directly determine the timing of each pulse generated by illumination driver IC 140. In these embodiments, rather than having a pulse trigger signal (e.g., TRG1, TRG2) directly determine the timing of a pulse generated by illumination driver IC 140, a pulse trigger signal is employed to trigger the generation of a pulse initiation signal. The pulse initiation signal, in turn, directly initiates the pulse generation, and also initiates the generation of the pulse termination signal. The pulse termination signal, in turn, directly terminates the pulse generation.

Figure 9:
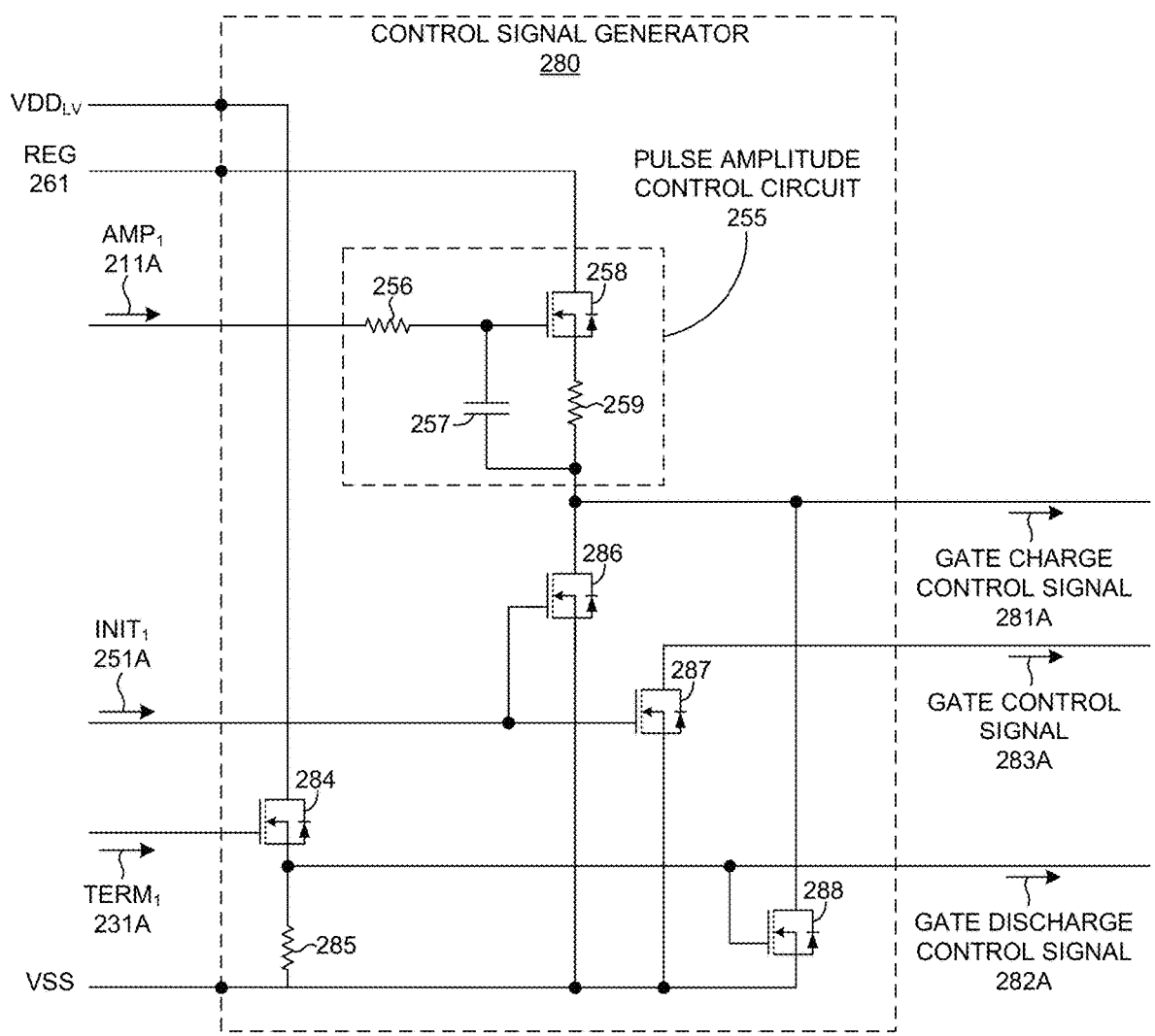
FIG. 9 depicts a simplified diagram illustrative of one embodiment of a control signal generator of the multiple channel, GaN based illumination driver IC depicted in FIG. 3.

FIG. 9 depicts a control signal generator 280 in one embodiment. Control signal generator 280 is replicated as control signal generators 280A and 280B in illumination driver IC 140 depicted in FIG. 3. As depicted in FIG. 9, control signal generator 280 is implemented as control signal generator 280A depicted in FIG. 3 for explanatory purposes. Control signal generator 280 generates gate control signal 283A, gate charge control signal 281A and gate discharge control signal 282A based on the pulse initiation signal 251A, pulse termination signal 231A, and channel amplitude control signal 211A. The control signals generated by control signal generator 280 directly control the FETS that control the flow of current through an illumination source coupled to illumination driver 140.

Control signal generator 280 includes a pulse amplitude control circuit 255, FETS 284, 286, 287, 288, and resistor 285.

In another aspect, pulse termination signal generator 230 is configured to generate a pulse of programmable amplitude based on a value of an analog input signal. As depicted in FIG. 1, receiver IC 150 generates an analog amplitude control signal, $V_{AMP}$ 153, and communicates $V_{AMP}$ to illumination driver IC 140. In response, illumination driver IC 140 changes the pulse amplitude based on the received value of $V_{AMP}$.

Figure 11:
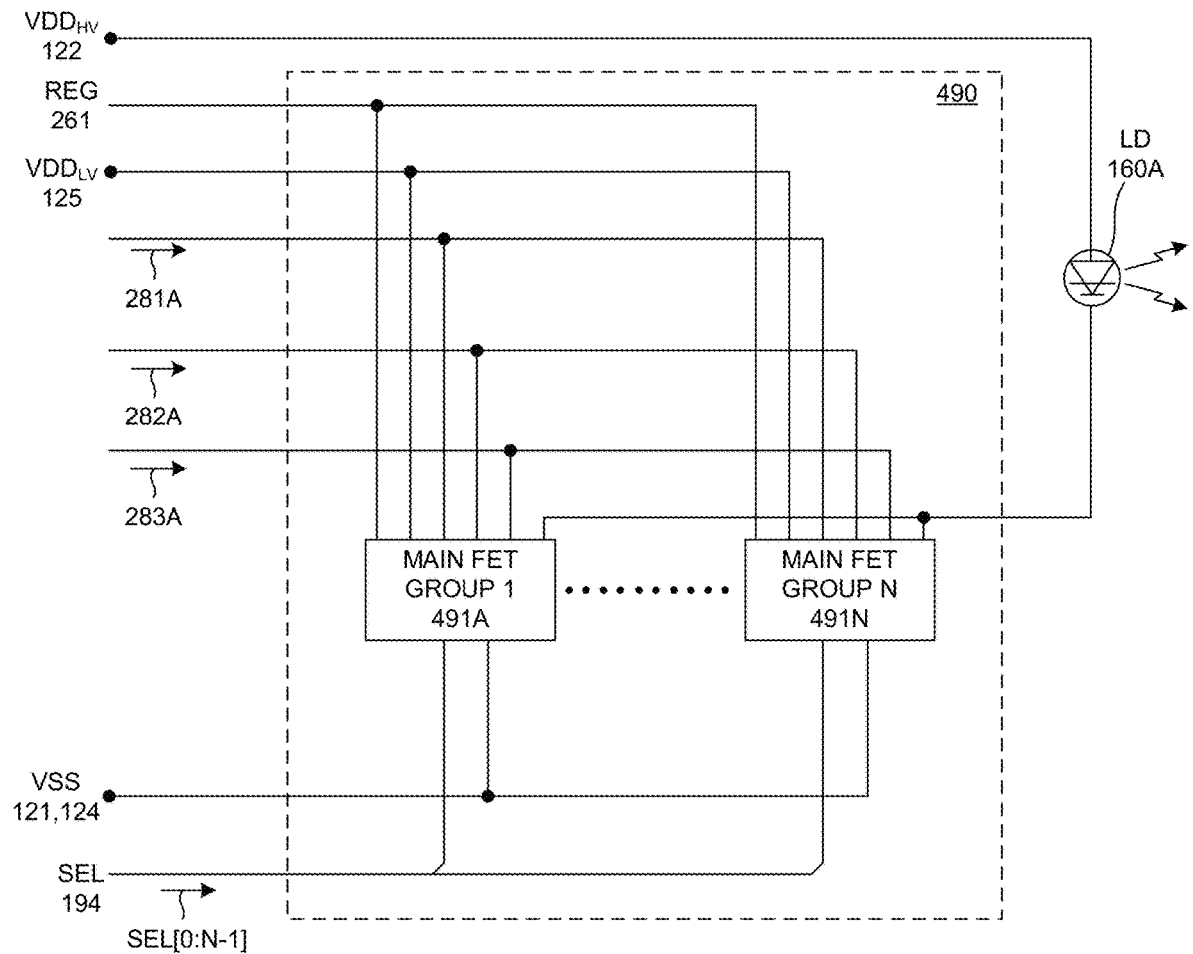
FIG. 11 depicts a simplified diagram illustrative of another embodiment of a power driver module of the multiple channel, GaN based illumination driver IC depicted in FIG. 3.

In the embodiment 140C of portions of illumination driver IC 140 depicted in FIG. 11, pulse amplitude control circuit 250 receives, $V_{AMP}$, that controls the amplitude of the pulse generated by illumination source 160.

When INIT1 251A goes low (signaling the start of a measurement pulse), FET 286 quickly releases the gate of a charge FET (e.g., charge FET 393 depicted in FIG. 10) from VSS via gate charge control signal 281A, allowing the charge FET to quickly charge. Similarly, FET 287 quickly releases the gate of the main FET (e.g., main FET 391 depicted in FIG. 10) from VSS, allowing the main FET to charge via gate control signal 283A.

When TERM1 231A goes high (signaling the end of a measurement pulse), FET 288 shorts the gate of the charge FET to VSS. Similarly, a discharge FET (e.g., discharge FET 394 depicted in FIG. 10) shorts the gate of the main FET to VSS via gate discharge control signal 282A as quickly as possible to shut off current flow through illumination source 160. FET 285 and resistor 285 provide a quick turn-on of the discharge FET and FET 288.

In addition, pulse amplitude control circuit 255 includes resistors 256 and 259, capacitor 257, and FET 258. Channel amplitude control signal, AMP1 211A, is received on a first node of resistor 256. The second node of resistor 256 is coupled to the gate of FET 258 and to a first node of capacitor 257. The drain of FET 258 is coupled to the regulated voltage supply, VREG, and receives regulated voltage 261. The source of FET 258 is coupled to a first node of resistor 259. The second node of resistor 259 is coupled to the second node of capacitor 257, where gate charge control signal 281A is provided. In this manner, the pulse amplitude control circuit 255 controls the charge at the gate of a charge FET (e.g., charge FET 393 depicted in FIG. 10).

As depicted in FIG. 12, the value of AMP1 controls the ramp rate of the pulse amplitude control circuit 255. As AMP1 increases, the rate of charge accumulation at the gate of FET 258 increases. In turn, this increases rate of charge accumulation on the gate of a charge FET via gate charge control signal 281A. This, in turn, increases the rate of charge accumulation on the gate of a main FET, which accelerates the ramp rate of the resulting illumination pulse generated by illumination source 160A. In this manner, AMP1, controls the peak amplitude of the illumination pulse for a given pulse duration.

Figure 10:
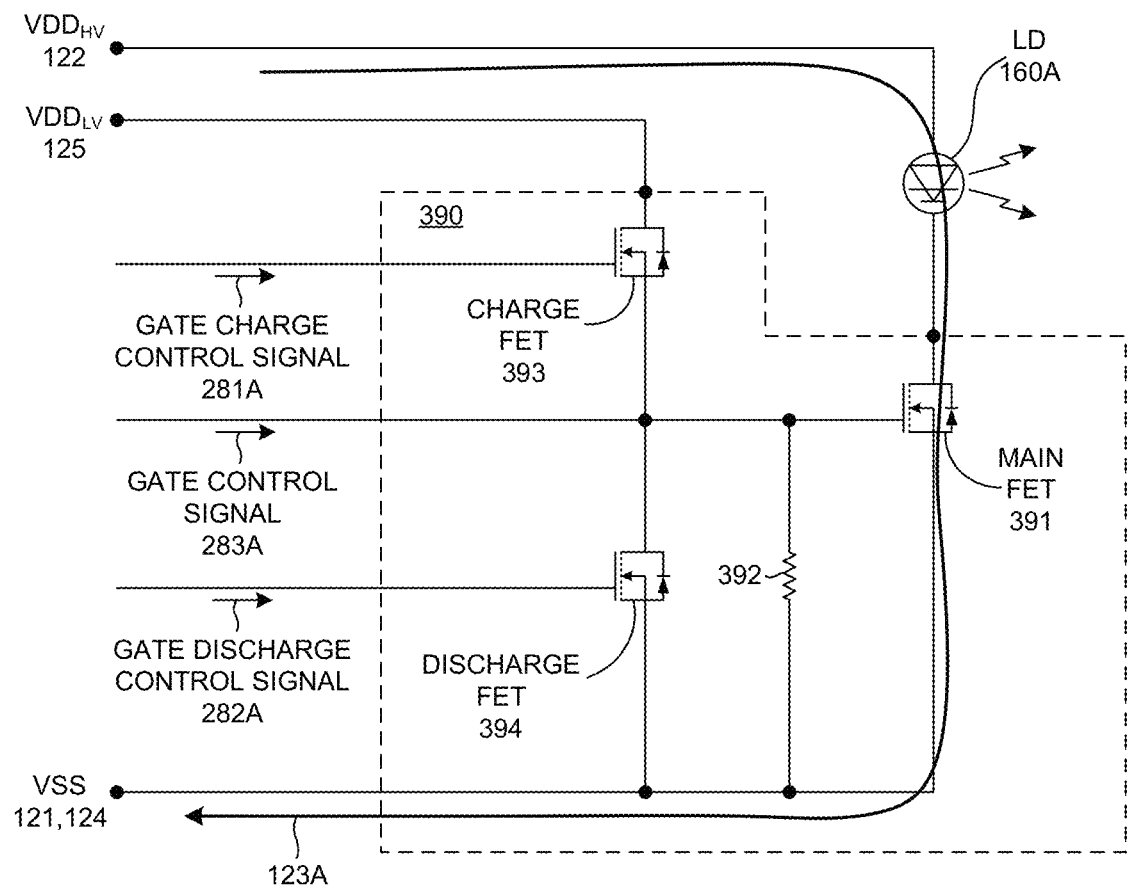
FIG. 10 depicts a simplified diagram illustrative of one embodiment of a power driver module of the multiple channel, GaN based illumination driver IC depicted in FIG. 3.

FIG. 10 depicts a power driver 390 in one embodiment. In some embodiments, power driver 390 is replicated as power drivers 290A and 290B in illumination driver IC 140 depicted in FIG. 3. As depicted in FIG. 10, power driver 390 is implemented as power driver 290A depicted in FIG. 3 for explanatory purposes. In the depicted embodiment, power driver 390 includes three FETs 391, 393, and 394 integrated onto GaN based IC 140. In the example depicted in FIG. 10, main FET 391 controls the flow of current 123A through illumination source 160A (e.g., laser diode 160A). Gate control signal 283A contributes to the gate voltage of main FET 393. In addition, charge FET 393 and discharge FET 394 also contribute to the gate voltage of main FET 391 and accelerate the transitions and minimize power losses.

As depicted in FIG. 10, the drain of charge FET 393 is coupled to voltage node 125 of low voltage supply 132 depicted in FIG. 1. The source of charge FET 393 is coupled to the drain of discharge FET 394 and to the gate of main FET 391. The source of discharge FET 394 is coupled to voltage node 124 of low voltage supply 132. In addition, a resistor 392 is coupled between the gate of main FET 391 and voltage node 124 of low voltage supply 132. A gate charge control signal 281A is provided at the gate of charge FET 393, and a gate discharge control signal 282A is provided at the gate of discharge FET 394. In this manner, gate charge control signal 281A, gate discharge control signal 282A, and gate control signal 283A determine the charge at the gate of main FET 391, and thus the conductive state of main FET 391.

Although FIG. 10 depicts embodiment 390 implemented as power driver 290A depicted in FIG. 3, in general, embodiment 390 may be implemented as a power driver of any LIDAR measurement channel (e.g., power driver 290A, 290B, or both).

The embodiment 390 of power driver module 290A depicted in FIG. 10 includes a single main FET 391 that determines the current flow through illumination source 160A. In another aspect, a power driver includes a number of different FETs configured to control the current flow through an illumination source. Moreover, the number of FETs coupled to each illumination source is programmable. This enables a programmable maximum current flow through each illumination source, and thus a programmable maximum illumination pulse amplitude.

FIG. 11 depicts a power driver 490 in another embodiment. In some embodiments, power driver 490 is replicated as power drivers 290A and 290B in illumination driver IC 140 depicted in FIG. 3. As depicted in FIG. 11, power driver 490 is implemented as power driver 290A depicted in FIG. 3 for explanatory purposes. Like numbered elements are described with reference to FIG. 10. As depicted in FIG. 11, N groups of one or more FETs are coupled in parallel with illumination source 160A, where N is any positive, integer number. A drain of each main FET of each FET group 491A-491N is coupled to a node of illumination source 160A. Similarly, a source of each main FET of each FET group 491A-491N is coupled to node 121 of power voltage supply 131. The gates of each main FET of each FET group 141A-141N are selectively coupled to the source of a charge FET and the drain of a discharge FET as described with reference to FIG. 10. Whether each main FET of a particular group of FETs is electrically coupled to the source of a charge FET and the drain of a discharge FET is determined by the state of selection signal, SEL 194, received from master controller 190. In the example depicted in FIG. 11, SEL is an N-bit word. Each bit corresponds with a particular main FET group. If a particular bit is in a high state, each main FET associated with the corresponding main FET group is coupled to the source of a charge FET and the drain of a discharge FET. In this state, gate control signal 283A, gate charge control signal 281A, and gate discharge control signal 282A determine the charge at the gate of each main FET of the corresponding main FET group. In this manner, the state of each bit of the N-bit word determines which main FET groups will participate in pulse generation by illumination source 160A.

Master controller 190 determines which FET groups should participate in the next measurement pulse by generating and communicating the SEL signal to illumination driver IC 140. In some examples, the determination is based on the return signal received from the prior measurement pulse. For example, if the received return signal is saturated, master controller 190 generates and communicates a selection signal, SEL, to illumination driver 140 with a larger number of zero valued bits to reduce the number of participating main FET groups. In this manner, the number of photons emitted in the next illumination pulse is reduced.

In some embodiments, the number of FETS in each main FET group is different. In this manner, different combinations of FET groups can be activated to achieve a wide range of participating FETs with uniform resolution.

Although FIG. 11 depicts embodiment 490 implemented as power driver 290A depicted in FIG. 3, in general, embodiment 490 may be implemented as a power driver of any LIDAR measurement channel (e.g., power driver 290A, 290B, or both).

Figure 13:
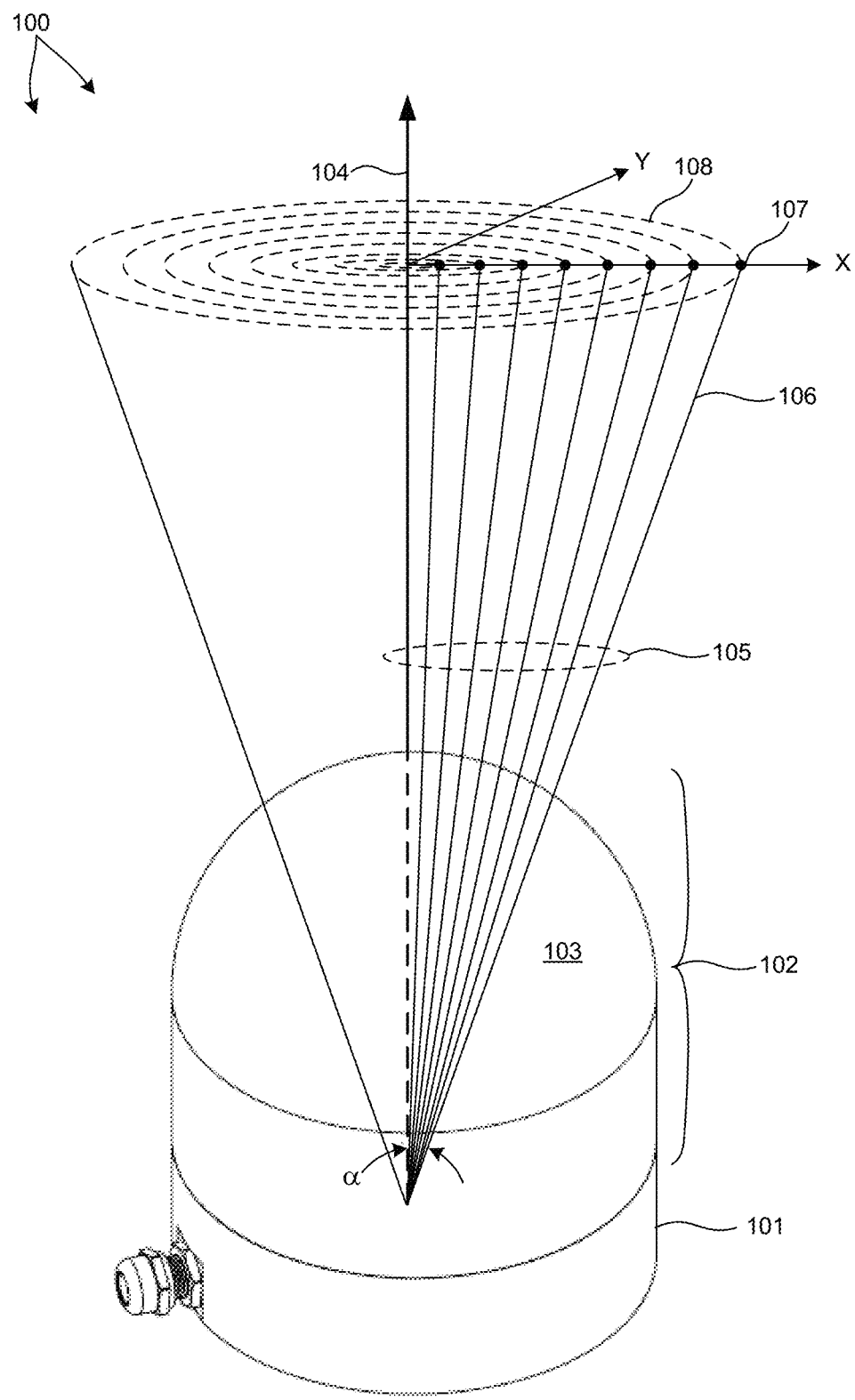
FIG. 13 is a diagram illustrative of an embodiment of a 3-D LIDAR system 100 in one exemplary operational scenario.
Figure 14:
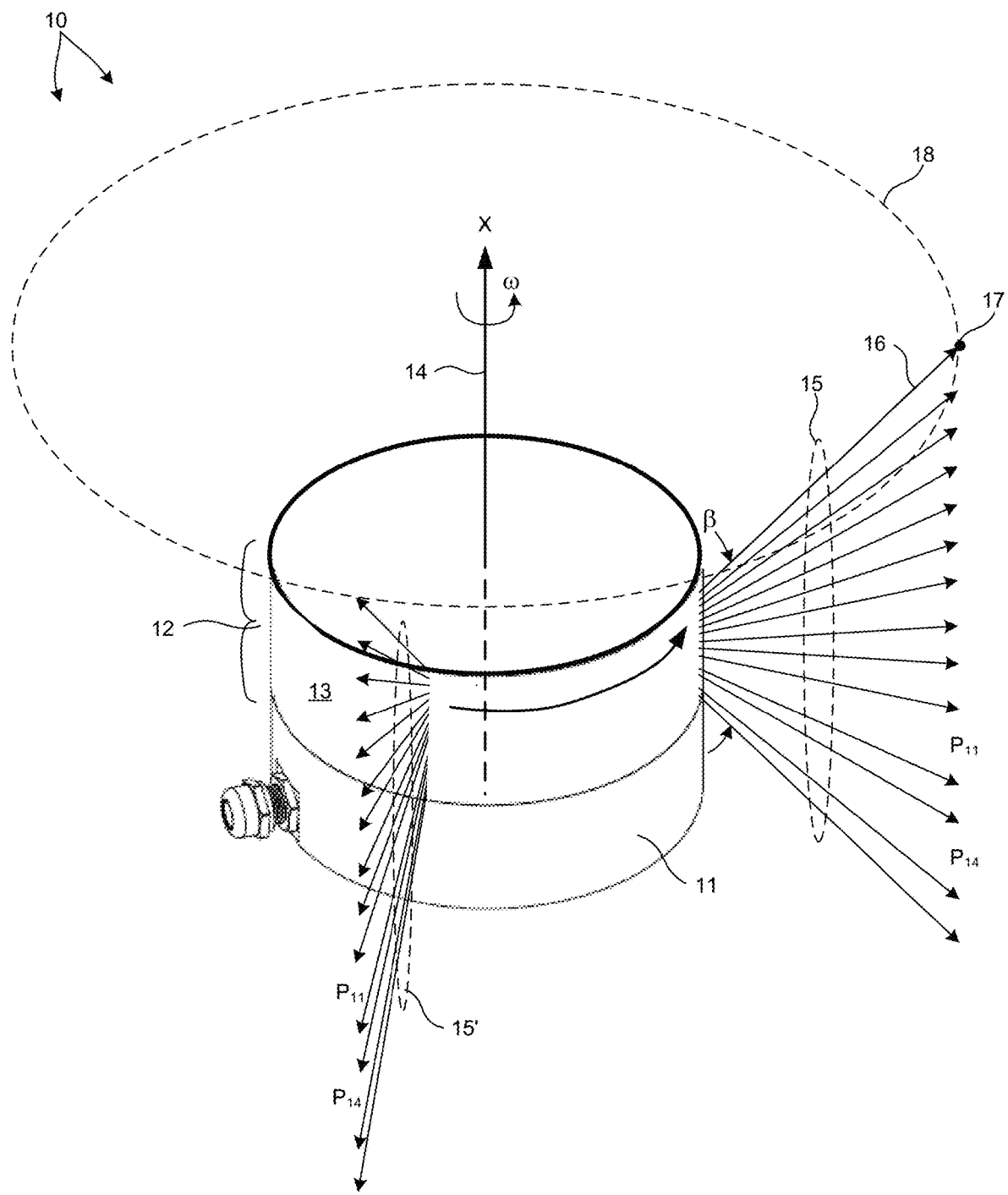
FIG. 14 is a diagram illustrative of another embodiment of a 3-D LIDAR system 10 in one exemplary operational scenario.
Figure 15:
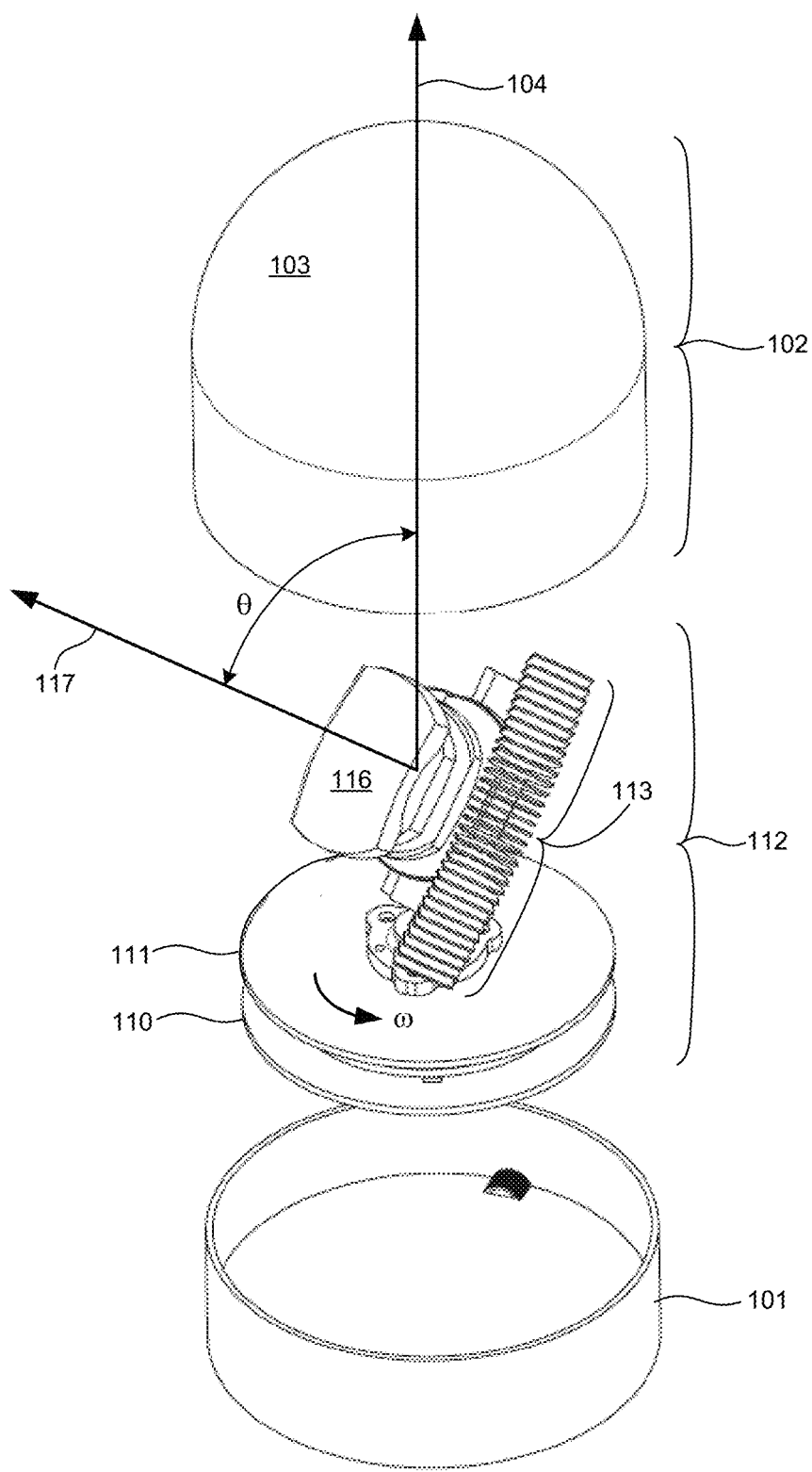
FIG. 15 depicts a diagram illustrative of an exploded view of 3-D LIDAR system 100 in one exemplary embodiment.

FIGS. 13-15 depict 3-D LIDAR systems that include one or more multiple channel GaN based illumination driver ICs. In some embodiments, a delay time is set between the firing of each LIDAR measurement channel. In some examples, the delay time is greater than the time of flight of the measurement pulse to and from an object located at the maximum range of the LIDAR device. In this manner, there is no cross-talk among any of the LIDAR measurement channels. In some other examples, a measurement pulse is emitted from one LIDAR measurement channel before a measurement pulse emitted from another LIDAR measurement channel has had time to return to the LIDAR device. In these embodiments, care is taken to ensure that there is sufficient spatial separation between the areas of the surrounding environment interrogated by each beam to avoid cross-talk.

FIG. 13 is a diagram illustrative of an embodiment of a 3-D LIDAR system 100 in one exemplary operational scenario. 3-D LIDAR system 100 includes a lower housing 101 and an upper housing 102 that includes a domed shell element 103 constructed from a material that is transparent to infrared light (e.g., light having a wavelength within the spectral range of 700 to 1,700 nanometers). In one example, domed shell element 103 is transparent to light having a wavelengths centered at 905 nanometers.

As depicted in FIG. 13, a plurality of beams of light 105 are emitted from 3-D LIDAR system 100 through domed shell element 103 over an angular range, α, measured from a central axis 104. In the embodiment depicted in FIG. 13, each beam of light is projected onto a plane defined by the x and y axes at a plurality of different locations spaced apart from one another. For example, beam 106 is projected onto the xy plane at location 107.

In the embodiment depicted in FIG. 13, 3-D LIDAR system 100 is configured to scan each of the plurality of beams of light 105 about central axis 104. Each beam of light projected onto the xy plane traces a circular pattern centered about the intersection point of the central axis 104 and the xy plane. For example, over time, beam 106 projected onto the xy plane traces out a circular trajectory 108 centered about central axis 104.

FIG. 14 is a diagram illustrative of another embodiment of a 3-D LIDAR system 10 in one exemplary operational scenario. 3-D LIDAR system 10 includes a lower housing 11 and an upper housing 12 that includes a cylindrical shell element 13 constructed from a material that is transparent to infrared light (e.g., light having a wavelength within the spectral range of 700 to 1,700 nanometers). In one example, cylindrical shell element 13 is transparent to light having a wavelengths centered at 905 nanometers.

As depicted in FIG. 14, a plurality of beams of light 15 are emitted from 3-D LIDAR system 10 through cylindrical shell element 13 over an angular range, β. In the embodiment depicted in FIG. 14, the chief ray of each beam of light is illustrated. Each beam of light is projected outward into the surrounding environment in a plurality of different directions. For example, beam 16 is projected onto location 17 in the surrounding environment. In some embodiments, each beam of light emitted from system 10 diverges slightly. In one example, a beam of light emitted from system 10 illuminates a spot size of 20 centimeters in diameter at a distance of 100 meters from system 10. In this manner, each beam of illumination light is a cone of illumination light emitted from system 10.

In the embodiment depicted in FIG. 14, 3-D LIDAR system 10 is configured to scan each of the plurality of beams of light 15 about central axis 14. For purposes of illustration, beams of light 15 are illustrated in one angular orientation relative to a non-rotating coordinate frame of 3-D LIDAR system 10 and beams of light 15' are illustrated in another angular orientation relative to the non-rotating coordinate frame. As the beams of light 15 rotate about central axis 14, each beam of light projected into the surrounding environment (e.g., each cone of illumination light associated with each beam) illuminates a volume of the environment corresponding the cone shaped illumination beam as it is swept around central axis 14.

FIG. 15 depicts an exploded view of 3-D LIDAR system 100 in one exemplary embodiment. 3-D LIDAR system 100 further includes a light emission/collection engine 112 that rotates about central axis 104. In the embodiment depicted in FIG. 15, a central optical axis 117 of light emission/collection engine 112 is tilted at an angle, θ, with respect to central axis 104. As depicted in FIG. 15, 3-D LIDAR system 100 includes a stationary electronics board 110 mounted in a fixed position with respect to lower housing 101. Rotating electronics board 111 is disposed above stationary electronics board 110 and is configured to rotate with respect to stationary electronics board 110 at a predetermined rotational velocity (e.g., more than 200 revolutions per minute). Electrical power signals and electronic signals are communicated between stationary electronics board 110 and rotating electronics board 111 over one or more transformer, capacitive, or optical elements, resulting in a contactless transmission of these signals. Light emission/collection engine 112 is fixedly positioned with respect to the rotating electronics board 111, and thus rotates about central axis 104 at the predetermined angular velocity, w.

As depicted in FIG. 15, light emission/collection engine 112 includes an array of LIDAR measurement devices 113. In some embodiments, each LIDAR measurement device is a multiple channel LIDAR measurement device such as LIDAR measurement device 120 illustrated in FIG. 1.

Light emitted from each LIDAR measurement device passes through a series of optical elements 116 that collimate the emitted light to generate a beam of illumination light projected from the 3-D LIDAR system into the environment. In this manner, an array of beams of light 105, each emitted from a different LIDAR measurement device are emitted from 3-D LIDAR system 100 as depicted in FIG. 13. In general, any number of LIDAR measurement devices can be arranged to simultaneously emit any number of light beams from 3-D LIDAR system 100. Light reflected from an object in the environment due to its illumination by a particular LIDAR measurement device is collected by optical elements 116. The collected light passes through optical elements 116 where it is focused onto the detecting element of the same, particular LIDAR measurement device. In this manner, collected light associated with the illumination of different portions of the environment by illumination generated by different LIDAR measurement devices is separately focused onto the detector of each corresponding LIDAR measurement device.

Figure 16:
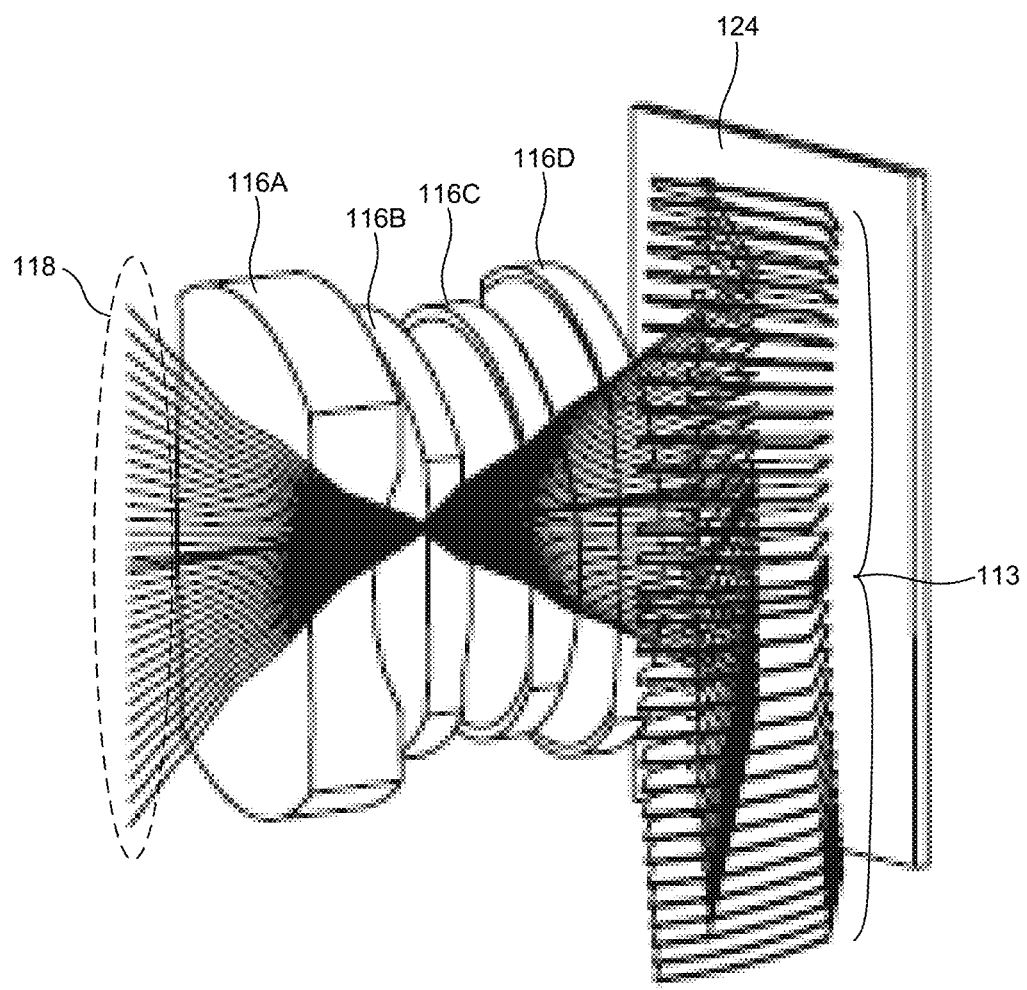
FIG. 16 depicts a view of optical elements 116 in greater detail.
Figure 17:
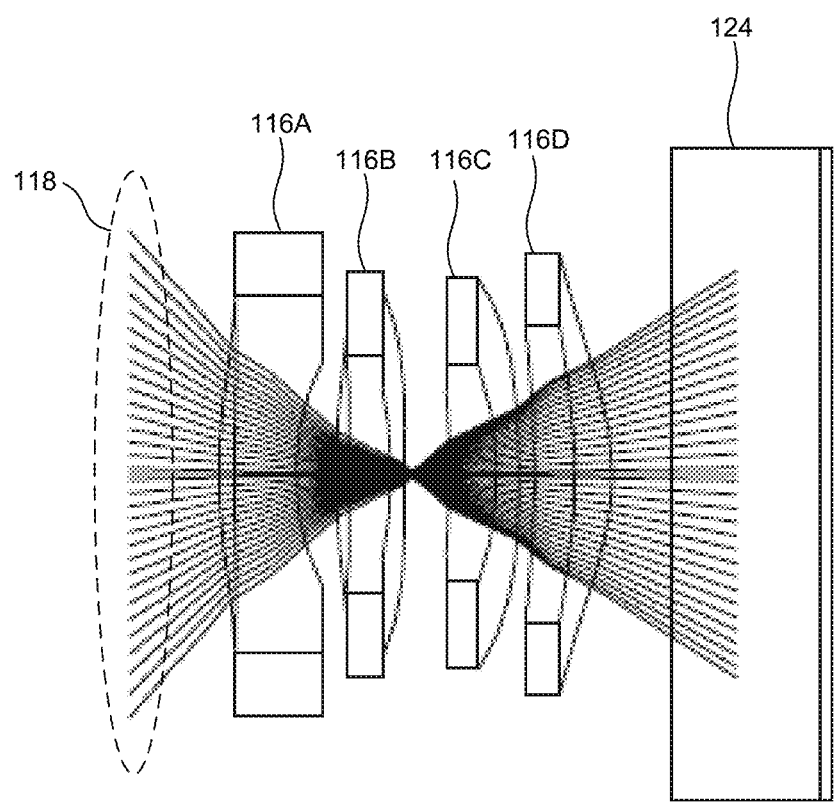
FIG. 17 depicts a cutaway view of optics 116 to illustrate the shaping of each beam of collected light 118.

FIG. 16 depicts a view of optical elements 116 in greater detail. As depicted in FIG. 16, optical elements 116 include four lens elements 116A-D arranged to focus collected light 118 onto each detector of the array of LIDAR measurement devices 113. In the embodiment depicted in FIG. 16, light passing through optics 116 is reflected from mirror 124 and is directed onto each detector of the array of LIDAR measurement devices 113. In some embodiments, one or more of the optical elements 116 is constructed from one or more materials that absorb light outside of a predetermined wavelength range. The predetermined wavelength range includes the wavelengths of light emitted by the array of integrated LIDAR measurement devices 113. In one example, one or more of the lens elements are constructed from a plastic material that includes a colorant additive to absorb light having wavelengths less than infrared light generated by each of the array of integrated LIDAR measurement devices 113. In one example, the colorant is Epolight 7276A available from Aako BV (The Netherlands). In general, any number of different colorants can be added to any of the plastic lens elements of optics 116 to filter out undesired spectra.

FIG. 16 depicts a cutaway view of optics 116 to illustrate the shaping of each beam of collected light 118.

In this manner, a LIDAR system, such as 3-D LIDAR system 10 depicted in FIG. 14, and system 100, depicted in FIG. 13, includes a plurality of LIDAR measurement devices each emitting multiple pulsed beams of illumination light from the LIDAR device into the surrounding environment and measuring return light reflected from objects in the surrounding environment.

In some embodiments, such as the embodiments described with reference to FIG. 13 and FIG. 14, an array of LIDAR measurement devices is mounted to a rotating frame of the LIDAR device. This rotating frame rotates with respect to a base frame of the LIDAR device. However, in general, an array of LIDAR measurement devices may be movable in any suitable manner (e.g., gimbal, pan/tilt, etc.) or fixed with respect to a base frame of the LIDAR device.

In some other embodiments, each LIDAR measurement device includes a beam directing element (e.g., a scanning mirror, MEMS mirror etc.) that scans the illumination beams generated by the LIDAR measurement device.

In some other embodiments, two or more LIDAR measurement devices each emit beams of illumination light toward a scanning mirror device (e.g., MEMS mirror) that reflects the beams into the surrounding environment in different directions.

In a further aspect, one or more LIDAR measurement devices are in optical communication with an optical phase modulation device that directs the illumination beams generated by the LIDAR measurement devices in different directions. The optical phase modulation device is an active device that receives a control signal that causes the optical phase modulation device to change state and thus change the direction of light diffracted from the optical phase modulation device. In this manner, the illumination beam generated by the LIDAR measurement devices are scanned through a number of different orientations and effectively interrogate the surrounding 3-D environment under measurement. The diffracted beams projected into the surrounding environment interact with objects in the environment. Each respective LIDAR measurement channel measures the distance between the LIDAR measurement system and the detected object based on return light collected from the object. The optical phase modulation device is disposed in the optical path between the LIDAR measurement device and an object under measurement in the surrounding environment. Thus, both illumination light and corresponding return light pass through the optical phase modulation device.

A computing system as described herein may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions implementing methods such as those described herein may be transmitted over a transmission medium such as a wire, cable, or wireless transmission link. Program instructions are stored in a computer readable medium. Exemplary computer-readable media include read-only memory, a random access memory, a magnetic or optical disk, or a magnetic tape.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A LIDAR measurement device, comprising:
a first electrical power source having a first node and a second node, wherein the first electrical power source provides a first voltage across the first and second nodes;
a first illumination source having a first node and a second node, wherein the first node of the first electrical power source is electrically coupled to the first node of the first illumination source;
a second illumination source having a first node and a second node, wherein the first node of the first electrical power source is electrically coupled to the first node of the second illumination source; and
a multiple channel, Gallium Nitride (GaN) based illumination driver integrated circuit (IC) comprising:
a first driver module electrically coupled to the second node of the first illumination source and to the second node of the first electrical power source, the first driver module configured to selectively electrically couple the second node of the first illumination source to the second node of the first electrical power source in response to a first pulse trigger signal in a first state causing the first illumination source to emit a first measurement pulse of illumination light; and
a second driver module electrically coupled to the second node of the second illumination source and to the second node of the first electrical power source, the second driver module configured to selectively electrically couple the second node of the second illumination source to the second node of the first electrical power source in response to a second pulse trigger signal in the first state causing the second illumination source to emit a second measurement pulse of illumination light at a different time than the first measurement pulse of illumination light.

2. The LIDAR measurement device of claim 1, the multiple channel, GaN based illumination driver IC further comprising:
a power regulation module electrically coupled to the first and second driver modules, wherein the power regulation module supplies regulated electrical power to the first and second driver modules only when any of the first pulse trigger signal and the second pulse trigger signal is in the first state.

3. The LIDAR measurement device of claim 2, wherein each driver module includes:
a power driver module that selectively electrically couples a corresponding illumination source to the first electrical power source based on a plurality of gate control signals;
a control signal generator that generates the plurality of gate control signals based on a pulse initiation signal, a pulse termination signal, and a channel pulse amplitude control signal; and
a power control module electrically coupled to the control signal generator, wherein the power control module generates the channel pulse amplitude control signal based on a state of a corresponding pulse trigger signal and communicates the channel pulse amplitude control signal to the control signal generator.

4. The LIDAR measurement device of claim 3, each power driver module further comprising:
a first field effect transistor (FET) having a source, a drain coupled to a first node of a second electrical power source, and a gate configured to receive a gate charge control signal;
a second FET having a drain coupled to the source of the first FET, a source coupled to a second node of the second electrical power source, and a gate configured to receive a gate discharge control signal; and
a third FET having a gate coupled to the source of the first FET and the drain of the second FET, a drain coupled to the second node of the corresponding illumination source, and a source coupled to the second node of the first electrical power source, wherein the gate charge control signal causes the gate of the third FET to be selectively coupled to the first node of the second electrical power source, and wherein the gate discharge control signal causes the gate of the third FET to be selectively coupled to the second node of the second electrical power source.

5. The LIDAR measurement device of claim 3, each power driver module further comprising:
a field effect transistor (FET) group including a first plurality of FETs operable to electrically couple the corresponding illumination source to the first electrical power source based on a value of a first bit of a FET selection signal; and
a second field effect transistor (FET) group including a second plurality of FETs operable to electrically couple the corresponding illumination source to the first electrical power source based on a value of a second bit of the FET selection signal, wherein the first plurality of FETs is a different number of FETs than the second plurality of FETs.

6. The LIDAR measurement device of claim 3, each power control module comprising:
a delay module that receives the corresponding pulse trigger signal and generates a delayed pulse trigger signal; and
a power save module that receives the delayed pulse trigger signal and generates the channel pulse amplitude signal based on the delayed pulse trigger signal and a pulse amplitude control signal received by the first and second driver modules.

7. The LIDAR measurement device of claim 3, wherein each driver module includes a pulse initiation signal generator that generates a pulse initiation signal based on the corresponding pulse trigger signal and communicates the pulse initiation signal to the control signal generator.

8. The LIDAR measurement device of claim 7, wherein each pulse initiation signal generator includes:
a resistor having a first node and a second node, wherein the first node is coupled to a first node of a second electrical power source; and
a field effect transistor (FET) having a source coupled to a second node of the second electrical power source, a drain coupled to the second node of the resistor, and a gate, wherein the pulse trigger signal is provided at the gate of the FET, and wherein the pulse initiation signal is provided at the drain of the FET.

9. The LIDAR measurement device of claim 7, wherein each driver module includes a pulse termination signal generator that receives the pulse initiation signal and a pulse width control signal received by both the first and second driver modules, wherein the pulse termination signal generator generates a pulse termination signal based on the pulse initiation signal, wherein a delay between the pulse initiation signal and the pulse termination signal is based on the pulse width control signal.

10. The LIDAR measurement device of claim 3, wherein each control signal generator includes a pulse amplitude control circuit that controls an amplitude of a corresponding measurement pulse of illumination light based on the channel pulse amplitude control signal received from the power control module.

11. The LIDAR measurement device of claim 10, wherein the pulse amplitude control circuit includes:
a first resistor having a first node and a second node, wherein the channel pulse amplitude control signal is provided on the first node of the first resistor;
a FET having a source, a gate coupled to the second node of the first resistor, and a drain coupled to an output node of the power regulation module;
a second resistor having a first node coupled to the source of the FET and a second node coupled to a gate of a charge control FET; and
a capacitor having a first node coupled to the second node of the first resistor and a second node coupled to the second node of the second resistor.

12. The LIDAR measurement device of claim 2, the power regulation module comprising:
a logic circuit that receives the first pulse trigger signal and the second pulse trigger signal and generates an input signal in the first state if any of the first pulse trigger signal and the second pulse trigger signal is in the first state; and
a regulator module that receives the input signal and supplies regulated electrical power to the first and second driver modules when the input signal is in the first state.

13. The LIDAR measurement device of claim 1, wherein the first pulse trigger signal and the second pulse trigger signal are the only signals received on the multiple channel, GaN based illumination driver IC not communicated to both the first and second driver modules.

14. The LIDAR measurement device of claim 1, further comprising:

a first photodetector configured to detect a first return pulse of light and generate a first output signal indicative of the detected first return pulse, wherein the first return pulse includes an amount of light reflected from a first location in a surrounding environment illuminated by the first measurement pulse of illumination light;

a first return pulse receiver IC configured to determine a time of flight of the first measurement pulse from the LIDAR device to the first location in a three dimensional environment and back to the LIDAR device based on the first output signal, wherein the first return pulse receiver IC generates the first pulse trigger signal and communicates the first pulse trigger signal to the multiple channel, GaN based illumination driver IC;

a second photodetector configured to detect a second return pulse of light and generate a second output signal indicative of the detected second return pulse, wherein the second return pulse includes an amount of light reflected from a second location in the surrounding environment illuminated by the second measurement pulse of illumination light; and a second return pulse receiver IC configured to determine a time of flight of the second measurement pulse from the LIDAR device to the second location in the three dimensional environment and back to the LIDAR device based on the second output signal, wherein the second return pulse receiver IC generates the second pulse trigger signal and communicates the second pulse trigger signal to the multiple channel, GaN based illumination driver IC.

15. A multiple channel, Gallium Nitride (GaN) based LIDAR illumination driver integrated circuit (IC) comprising:

a first driver module electrically coupled to an electrical power source and a first LIDAR illumination source, the first driver module configured to selectively electrically couple the first LIDAR illumination source to the electrical power source in response to a first pulse trigger signal in a first state causing the first LIDAR illumination source to emit a first measurement pulse of illumination light;

a second driver module electrically coupled to the electrical power source and a second LIDAR illumination source, the second driver module configured to selectively electrically couple the second LIDAR illumination source to the electrical power source in response to a second pulse trigger signal in the first state causing the second LIDAR illumination source to emit a second measurement pulse of illumination light at a different time than the first measurement pulse of illumination light; and a power regulation module electrically coupled to the first and second driver modules, wherein the power regulation module supplies regulated electrical power to the first and second driver modules only when any of the first pulse trigger signal and the second pulse trigger signal is in the first state.

16. The multiple channel, Gallium Nitride (GaN) based LIDAR illumination driver integrated circuit (IC) of claim 15, wherein the first pulse trigger signal and the second pulse trigger signal are the only signals received on the multiple channel, GaN based illumination driver IC not communicated to both the first and second driver modules.

17. The multiple channel, Gallium Nitride (GaN) based LIDAR illumination driver integrated circuit (IC) of claim 15, wherein each driver module includes:

a power driver module that selectively electrically couples a corresponding illumination source to the electrical power source based on a plurality of gate control signals;

a control signal generator that generates the plurality of gate control signals based on a pulse initiation signal, a pulse termination signal, and a channel pulse amplitude control signal; and a power control module electrically coupled to the control signal generator, wherein the power control module generates the channel pulse amplitude control signal based on a state of a corresponding pulse trigger signal and communicates the channel pulse amplitude control signal to the control signal generator.

18. A multiple channel, Gallium Nitride (GaN) based LIDAR illumination driver integrated circuit (IC) comprising:

a first node configured to receive a first pulse trigger signal;

a second node configured to receive a second pulse trigger control signal;

a first driver module electrically coupled to an electrical power source and a first LIDAR illumination source, the first driver module configured to selectively electrically couple the first LIDAR illumination source to the electrical power source in response to the first pulse trigger signal in a first state causing the first LIDAR illumination source to emit a first measurement pulse of illumination light; and a second driver module electrically coupled to the electrical power source and a second LIDAR illumination source, the second driver module configured to selectively electrically couple the second LIDAR illumination source to the electrical power source in response to the second pulse trigger signal in the first state causing the second LIDAR illumination source to emit a second measurement pulse of illumination light at a different time than the first measurement pulse of illumination light, wherein the first pulse trigger signal and the second pulse trigger signal are the only signals received on the multiple channel, GaN based illumination driver IC not communicated to both the first and second driver modules.

19. The multiple channel, Gallium Nitride (GaN) based LIDAR illumination driver integrated circuit (IC) of claim 18, further comprising:

a power regulation module electrically coupled to the first and second driver modules, wherein the power regulation module supplies regulated electrical power to the first and second driver modules only when any of the first pulse trigger signal and the second pulse trigger signal is in the first state.

20. The multiple channel, Gallium Nitride (GaN) based LIDAR illumination driver integrated circuit (IC) of claim 18, wherein each driver module includes:

a power driver module that selectively electrically couples a corresponding illumination source to the electrical power source based on a plurality of gate control signals;

a control signal generator that generates the plurality of gate control signals based on a pulse initiation signal, a pulse termination signal, and a channel pulse amplitude control signal; and a power control module electrically coupled to the control signal generator, wherein the power control module generates the channel pulse amplitude control signal based on a state of a corresponding pulse trigger signal and communicates the channel pulse amplitude control signal to the control signal generator.

* * * * *